United States Patent
Roberts et al.

(10) Patent No.: US 11,983,354 B2
(45) Date of Patent: May 14, 2024

(54) CIRCUITRY FOR TOUCH-SENSITIVE APPARATUS AND METHOD

(71) Applicant: TouchNetix Limited, Fareham (GB)

(72) Inventors: Stephen William Roberts, Fareham (GB); Peter Timothy Sleeman, Fareham (GB)

(73) Assignee: TouchNetix Limited, Fareham (GB)

( * ) Notice: Subject to any disclaimer, the term of this patent is extended or adjusted under 35 U.S.C. 154(b) by 0 days.

(21) Appl. No.: 17/995,513

(22) PCT Filed: Mar. 29, 2021

(86) PCT No.: PCT/GB2021/050774
§ 371 (c)(1),
(2) Date: Oct. 5, 2022

(87) PCT Pub. No.: WO2021/219974
PCT Pub. Date: Nov. 4, 2021

(65) Prior Publication Data
US 2023/0176675 A1   Jun. 8, 2023

(30) Foreign Application Priority Data
Apr. 29, 2020  (GB) ..................... 2006301

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05)

(58) Field of Classification Search
CPC ................ G06F 3/0416; G06F 3/0446; G06F 2203/04104; G06F 3/0445; G06F 3/0443; G06F 3/041; G06F 3/042; G06F 3/03
See application file for complete search history.

(56) References Cited

U.S. PATENT DOCUMENTS

2014/0022185 A1   1/2014  Ribeiro et al.
2015/0268758 A1*  9/2015  Lo ..................... G06F 3/0446
                                                   345/174
(Continued)

FOREIGN PATENT DOCUMENTS

| EP | 2264568 A2 | 12/2010 |
| EP | 2264568 A3 | 12/2010 |
| WO | 2015048584 A1 | 4/2015 |

OTHER PUBLICATIONS

International Search Report and Written Opinion for International Application No. PCT/GB2021/050774 dated Jun. 23, 2021.
(Continued)

*Primary Examiner* — Pegeman Karimi
(74) *Attorney, Agent, or Firm* — Renner, Otto, Boisselle & Sklar, LLP

(57) ABSTRACT

Disclosed is circuitry for calculating the magnitude of a received signal from an electrode of a capacitive touch sensitive apparatus. The circuitry includes a first digital signal generating module configured to generate a first digital signal, the first digital signal representing a sinusoidal wave having a first frequency, and a second digital signal generating module configured to generate a second digital signal, the second digital signal representing a sinusoidal wave having the first frequency, wherein the second digital signal is orthogonal to the first digital signal. The circuitry also includes a sensing module for coupling to an electrode array, the sensing module configured to receive the first digital signal, provide a driving signal to at least one electrode of the electrode array based on the first digital signal, and output a received digital signal, wherein the received digital signal is indicative of a capacitive coupling experienced by the at least one electrode. The circuitry includes a first multiplier module configured to receive the first digital signal and the received digital signal and mul- (Continued)

tiply the two digital signals together; a second multiplier module configured to receive the second digital signal and the received digital signal and multiply the two digital signals together; and a signal magnitude calculating module configured to calculate the magnitude of the received digital signal based on the output from the first multiplier module and the second multiplier module. Also disclosed is a touch sensitive apparatus including the circuitry and a method for calculating the magnitude of a received signal from an electrode of a capacitive touch sensitive apparatus.

17 Claims, 8 Drawing Sheets

(56) References Cited

U.S. PATENT DOCUMENTS

| 2017/0228059 A1* | 8/2017 | Chen ..................... G06F 3/0446 |
| 2018/0113559 A1* | 4/2018 | Bae ..................... G06F 3/03545 |
| 2019/0171331 A1 | 6/2019 | Gray et al. |
| 2019/0235728 A1* | 8/2019 | Konda .................. G06F 3/0441 |

OTHER PUBLICATIONS

United Kingdom combined Search and Examination Report for Great Britain Utility Application No. GB2006301.2 dated Jan. 8, 2021.

* cited by examiner

US 11,983,354 B2

CIRCUITRY FOR TOUCH-SENSITIVE APPARATUS AND METHOD

This application is a national phase of International Application No. PCT/GB2021/050774 filed Mar. 29, 2021, which claims priority to Great Britain Application No. 2006301.2 filed Apr. 29, 2020, each of which is hereby incorporated herein by reference in its entirety.

BACKGROUND OF THE INVENTION

The present invention relates to the field of touch sensors, for example touch sensors for overlying a display screen to provide a touch-sensitive display (touch screen). In particular, embodiments of the invention relate to techniques for measuring the capacitance using drive electrodes and receive electrodes for sensing the presence of one or more touching objects within a two-dimensional sensing area.

A capacitive touch sensor can be generalised as one that uses a physical sensor element comprising an arrangement of electrically conductive electrodes extending over a touch sensitive area (sensing area) to define sensor nodes (or intersection points) and controller circuitry connected to the electrodes and operable to measure changes in the electrical capacitance of each of the electrodes or the mutual-capacitance between combinations of the electrodes. The electrodes are typically provided on a substrate.

For such capacitive touch sensors, circuitry is arranged to apply an analogue signal (i.e. a time-varying voltage) to the electrodes in order to perform a measurement of the capacitance. Such a signal typically results in an analogue signal (such as a time varying current) that is received or obtained from the electrodes, with this analogue signal including information regarding the measured capacitance for a given electrode or at a given intersection point. Techniques have been developed for analysing the analogue signal and for determining whether a touch (or an object) is present.

However, in some respects, these techniques are not optimal and offer certain disadvantages in certain applications. There is therefore a desire to provide circuitry for touch sensors which can offer an improvement processing of received signals from the electrode array.

SUMMARY OF THE INVENTION

According to a first aspect of the disclosure there is provided circuitry for calculating the magnitude of a received signal from an electrode of a capacitive touch sensitive apparatus. The circuitry includes: a first digital signal generating module configured to generate a first digital signal, the first digital signal representing a sinusoidal wave having a first frequency; a second digital signal generating module configured to generate a second digital signal, the second digital signal representing a sinusoidal wave having the first frequency, wherein the second digital signal is orthogonal to the first digital signal; a sensing module for coupling to an electrode array, the sensing module configured to receive the first digital signal, provide a driving signal to at least one electrode of the electrode array based on the first digital signal, and output a received digital signal, wherein the received digital signal is indicative of a capacitive coupling experienced by the at least one electrode; a first multiplier module configured to receive the first digital signal and the received digital signal and multiply the two digital signals together; a second multiplier module configured to receive the second digital signal and the received digital signal and multiply the two digital signals together; and a signal magnitude calculating module configured to calculate the magnitude of the received digital signal based on the output from the first multiplier module and the second multiplier module.

In accordance with certain aspects the first multiplier and the second multiplier are digital multipliers configured to use a digital multiplication process to digitally multiply the first or second digital signal respectively with the received digital signal.

In accordance with certain aspects the first multiplier module is configured to multiply a portion of the first digital signal and a portion of the received digital signal that correspond in time, and multiply the corresponding portions of the first digital signal and the received digital signal together, and wherein the second multiplier module is configured to multiply a portion of the second digital signal and a portion of the received digital signal that correspond in time, and multiply the corresponding portions of the second digital signal and the received digital signal together.

In accordance with certain aspects the circuitry further includes: a first accumulator module; and a second accumulator module, wherein the first accumulator module is configured to sum a plurality of outputs from the first multiplier module each corresponding to the multiplication of corresponding portions in time of the first digital signal with the received digital signal over a predetermined period of time, wherein the second accumulator module is configured to sum a plurality of outputs from the second multiplier module each corresponding to the multiplication of corresponding portions in time of the second digital signal with the received digital signal over the predetermined period of time, and wherein the first and second accumulator modules are each configured to output the corresponding summations to the signal magnitude calculating module after the predetermined period of time has elapsed.

In accordance with certain aspects the signal magnitude calculating module is configured to calculate the magnitude of the received digital signal using a CORDIC algorithm.

In accordance with certain aspects the first digital signal and the second digital signal represent a sinusoidal wave having a single frequency.

In accordance with certain aspects the first digital signal, the second digital signal and the received digital signal are represented using a binary sequence.

In accordance with certain aspects the circuitry is configured to apply a window function to the first and second digital signals prior to the first and second digital signals being received at the first and second multiplier modules respectively.

In accordance with certain aspects the circuitry is configured to apply a window function to the first digital signal prior to the first digital signal being applied to the sensing module.

In accordance with certain aspects the second digital signal generating module is configured to generate the second digital signal based on a sinusoidal wave that is 90° out of phase with the sinusoidal wave used to generate the first digital signal by the first digital signal generating module.

In accordance with certain aspects the sensing module comprises a digital to analogue converter, DAC, and an analogue to digital converter, ADC, wherein the DAC is configured to receive the first digital signal and convert the first digital signal to an analogue signal as the drive signal, and wherein the ADC is configured to receive an analogue receive signal from the electrode array and convert the analogue received signal to the digital receive signal.

In accordance with certain aspects the ADC is a sigma-delta ADC.

In accordance with certain aspects the DAC comprises a one-bit DAC.

In accordance with certain aspects the circuitry further comprises a signal phase shift calculating module configured to output the phase shift of the received signal relative to the first digital signal based on the output from the first multiplier module and the second multiplier module.

In accordance with certain aspects the circuitry further includes a third multiplier module configured to receive the first digital signal and a second received digital signal and multiply the two digital signals together; and a fourth multiplier module configured to receive the second digital signal and the second received digital signal and multiply the two digital signals together, wherein the second received digital signal is a digital signal received from a different electrode of the electrode array than the received digital signal, and wherein the signal magnitude calculating module is configured to calculate the magnitude of the received signal based on the output from the first multiplier module and the second multiplier module, and to calculate the magnitude of the second received digital signal based on the output from the third multiplier module and the fourth multiplier module.

According to a second aspect of the disclosure there is provided touch sensitive apparatus including: the circuitry according to the first aspect of the disclosure; an electrode array coupled to the circuitry; and control circuitry configured to receive the output from the circuitry and configured to sense at least the presence or an absence of a touch in the proximity of the electrode array.

According to a third aspect of the disclosure there is provided a method for calculating the magnitude of a received signal from an electrode of capacitive touch sensitive apparatus, the method including: generating a first digital signal, the first digital signal representing a sinusoidal wave having a first frequency; generating a second digital signal generating module configured to generate a second digital signal, the second digital signal representing a sinusoidal wave having the first frequency, wherein the second digital signal is orthogonal to the first digital signal; applying a driving signal to at least one electrode of an electrode array based on the first digital signal; receive a digital signal, wherein the received digital signal is indicative of a capacitive coupling experienced by the at least one electrode; multiplying the first digital signal and the received digital signal together; multiplying the second digital signal and the received digital signal together; and calculating the magnitude of the received digital signal based on the output from multiplying the first digital signal and the received digital signal together and multiplying the second digital signal and the received digital signal together.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

The present disclosure relates broadly to measurement circuitry for use in touch sensitive apparatus (which comprises an array of electrodes forming a touch sensitive surface) for determining the magnitude of a received signal from the electrode array. The determined magnitude may be used for assessing whether a touch (or another object capable of being sensed) is present at or in the proximity of the touch sensitive surface.

More specifically, the present disclosure relates to implementing the above measurement circuitry using digital processing and, in particular, calculating the magnitude of the received (digital) signal using digital processing techniques. The use of digital processing has advantages over analogue techniques.

Figure 1:
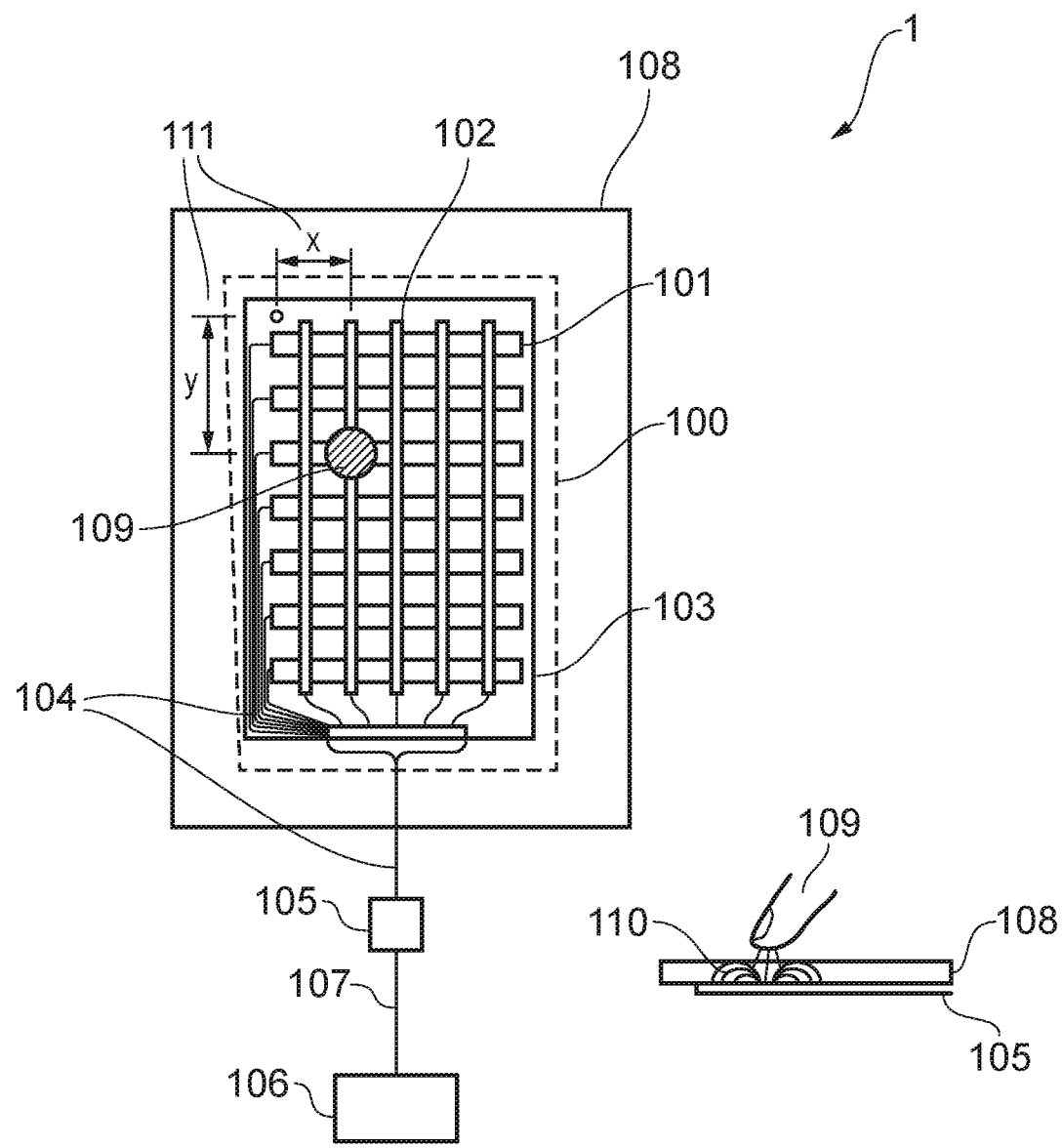
FIG. 1 schematically illustrates a touch sensitive apparatus incorporating measurement circuitry in accordance with certain embodiments of the invention.

FIG. 1 schematically shows an example touch-sensitive apparatus 1. The touch-sensitive apparatus 1 is represented in plan view (to the left in the figure) and also in cross-sectional view (to the right in the figure).

The touch-sensitive apparatus 1 comprises a sensor element 100, measurement circuitry 105, control circuitry 106, and cover 108. The sensor element 100 and cover 108 may, more generally be referred to as a touch screen or touch-sensitive element of the touch-sensitive apparatus 1, while the measurement circuitry 105 and processing circuitry 106 may, collectively, be referred to as the controller of the touch-sensitive apparatus 1.

The touch screen is primarily configured for establishing the position of a touch (or multiple touches) within a two-dimensional sensing area by providing Cartesian coordinates along an X-direction (horizontal in the figure) and a Y-direction (vertical in the figure). In this implementation, the sensor element 100 is constructed from a substrate 103 that could be glass or plastic or some other insulating material and upon which is arranged an array of electrodes (referred to herein as an electrode array) consisting of multiple laterally extending parallel electrodes, X-electrodes 101 (row electrodes), and multiple vertically extending parallel electrodes, Y-electrodes 102 (column electrodes), which in combination allow the position of a touch 109 to be determined. To clarify the terminology, and as will be seen from FIG. 1, the X-electrodes 101 (row electrodes) are aligned parallel to the X-direction and the Y-electrodes 102 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures. The X-electrodes 101 and Y-electrodes 102 define a sensing (or sense) area, which is a region of the substrate 103 which is sensitive to touch. In some cases, each electrode may have a more detailed structure than the simple "bar" structures represented in FIG. 1, but the operating principles are broadly the same.

The electrodes of the electrode array are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4). Referring back to FIG. 1, the electrodes 101, 102 are electrically connected via circuit conductors 104 to measurement circuitry 105, which is in turn connected to control circuitry 106 by means of a circuit conductor 107. The measurement circuitry 105 and/or the control circuitry 106 may each be provided by a (micro)controller, processor, ASIC or similar form of control chip. Although shown separately in FIG. 1, in some implementations, the measurement circuitry 106 and the control circuitry 106 may be provided by the same (micro)controller, processor, ASIC or similar form of control chip. The measurement circuitry 105 and/or the control circuitry 106 may be comprised of a printed circuit board (PCB), which may further include the various circuit conductors 104, 107. The measurement circuitry 105 and the control circuitry 106 may be formed on the same PCB, or separate PCBs. Note also that the functionality provided by either of the measurement circuitry 105 and the control circuitry 106 may be split across multiple circuit boards and/or across components which are not mounted to a PCB.

Generally speaking, the measurement circuitry 105 is configured to perform capacitance measurements associated with the electrodes 101, 102. The measurement circuitry 105 includes elements capable of applying a electrical signals (drive signals) for performing the capacitance measurements and, as described in more detail below, for performing some processing of the raw capacitance measurements. As described in more detail below, the measurement circuitry 105 outputs at least indications of the capacitance measurements to the control circuitry 106.

The control circuitry 106 may be configured to perform a number of functions, including controlling the operations of the measurement circuitry 105. For example, the control circuitry 106 may send control signals to the various components forming the measurement circuity 105 for controlling the operation of these components. In the described implementation, the control circuitry 106 is also provided with the capability to determine the presence of a touch 109, caused by an object such a human finger or a stylus coming into contact with (or being adjacent to) the sense area of the sensor element 100, based on an appropriate analysis of relative changes in the electrode array's measured capacitance/capacitive coupling. The control circuitry 106, may also be configured to, with appropriate analysis of relative changes in the electrode array's measured capacitance/capacitive coupling, calculate a touch position on the cover's surface as an XY coordinate 111. As described above, the functions of the control circuitry 106 may be provided across different circuit boards/components, and in the context of the implementation described above, it should be appreciated that dedicate circuit boards/components for the control of the measurement circuitry 105 and for processing of the capacitance measurements may be provided.

In the example of FIG. 1, a front cover (also referred to as a lens or panel) 108 is positioned in front of the substrate 103 and a single touch 109 on the surface of the cover 108 is schematically represented. Note that the touch itself does not generally make direct galvanic connection to the sensor 103 or to the electrodes 102. Rather, the touch influences the electric fields 110 that the measurement circuitry 105 generates using the electrodes 102 (described in more detail below).

A further aspect of capacitive touch sensors relates to the way the measurement circuitry 105 uses the electrodes of the sensor element 100 to make its measurements. There are two main techniques for measuring capacitance, one or both of which may be employed by the measurement circuitry 105 of the described implementation. That is to say, the measurement circuitry 105 is configured to determine capacitances of one or more of the electrodes of the electrode array using one or both of a first technique and a second technique.

Figure 2:
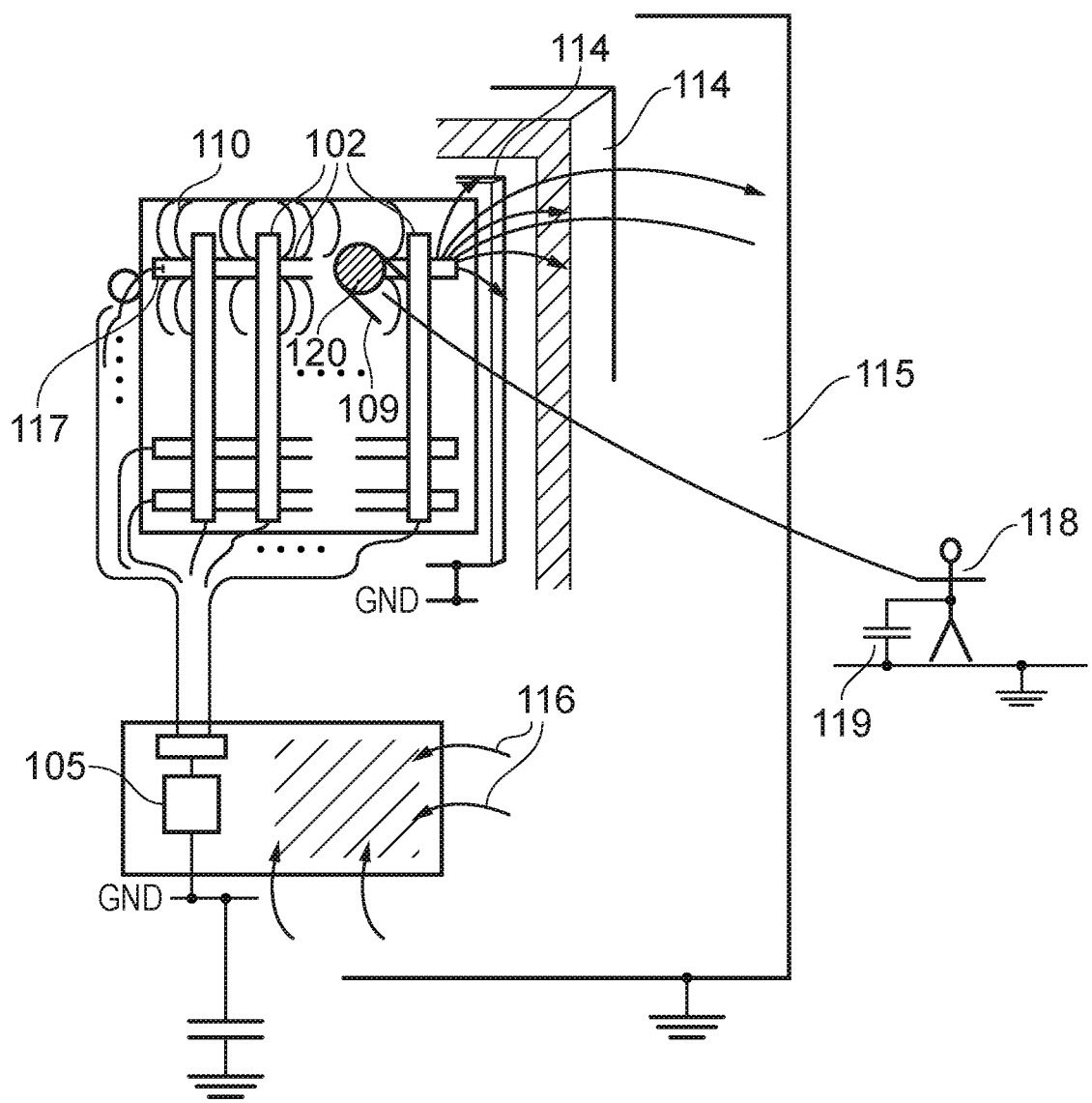
FIG. 2 schematically illustrates a self-capacitance measurement mode of the touch sensitive apparatus of FIG. 1, specifically with a view to explaining the principles of self capacitance measurement.

A first technique is based on measuring what is frequently referred to as "self-capacitance". Reference is made to FIG. 2. In FIG. 2, the measurement circuitry 105 is configured to generate and apply an electrical stimulus (drive signal) to each electrode 101, 102 which will cause an electric field 110 to form around it. This field 110 couples through the space around the electrode back to the measurement circuitry 105 via numerous conductive return paths that are part of the nearby circuitry of the sensor element 100 and the product housing (shown schematically by reference numeral 114), or physical elements from the nearby surroundings 115 etc., so completing a capacitive circuit 116. The overall sum of return paths is typically referred to as the "free space return path" in an attempt to simplify an otherwise hard-to-visualize electric field distribution. The important point to realise is that the measurement circuitry 105 is only driving each electrode from a single explicit electrical terminal 117; the other terminal is the capacitive connection via this "free space return path". The capacitance measured by the measurement circuitry 105 is the "self-capacitance" of the sensor electrode (and connected tracks) that is being driven relative to free space (or Earth as it is sometimes called) i.e. the "self-capacitance" of the relevant sensor electrode. Touching or approaching the electrode with a conductive element, such as a human finger, causes some of the field to couple via the finger through the connected body 118, through free space and back to the measurement circuitry 105. This extra return path 119 can be relatively strong for large objects (such as the human body), and so can give a stronger coupling of the electrode's field back to the measurement circuitry 105; touching or approaching the electrode hence increases the self-capacitance of the electrode. The measurement circuitry 105 is configured to sense this increase in capacitance. The increase is strongly proportional to the area 120 of the applied touch 109 and is normally weakly proportional to the touching body's size (the latter typically offering quite a strong coupling and therefore not being the dominant term in the sum of series connected capacitances).

In the described implementation, the electrodes 101, 102 are arranged on an orthogonal grid, generally with a first set of electrodes on one side of a substantially insulating substrate 103 and the other set of electrodes on the opposite side of the substrate 103 and oriented at substantially 90° to the first set. In other implementations, the electrodes may be oriented at a different angle (e.g., 30°) relative to one another. In addition, it should also be appreciated that it is also possible to provide structures where the grid of electrodes is formed on a single side of the substrate 103 and small conductive bridges are used to allow the two orthogonal sets of electrodes to cross each other without short circuiting. However, these designs are more complex to manufacture and less suitable for transparent sensors. Regardless of the arrangement of the electrodes, broadly speaking, one set of electrodes is used to sense touch position in a first axis that we shall call "X" and the second set to sense the touch position in the second orthogonal axis that we shall call "Y".

When the measurement circuitry 105 operates in accordance with the self-capacitance measuring mode, the measurement circuitry 105 can either drive each electrode in turn (sequential) with appropriate switching of a single control channel (i.e., via a multiplexer) or it can drive them all in parallel with an appropriate number of separate control channels. In the former sequential case, any neighbouring electrodes to a driven electrode are sometimes grounded by the measurement circuitry 105 to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the measurement circuitry 105 can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the measurement circuitry 105 if there is a voltage difference between the electrodes).

Figure 3:
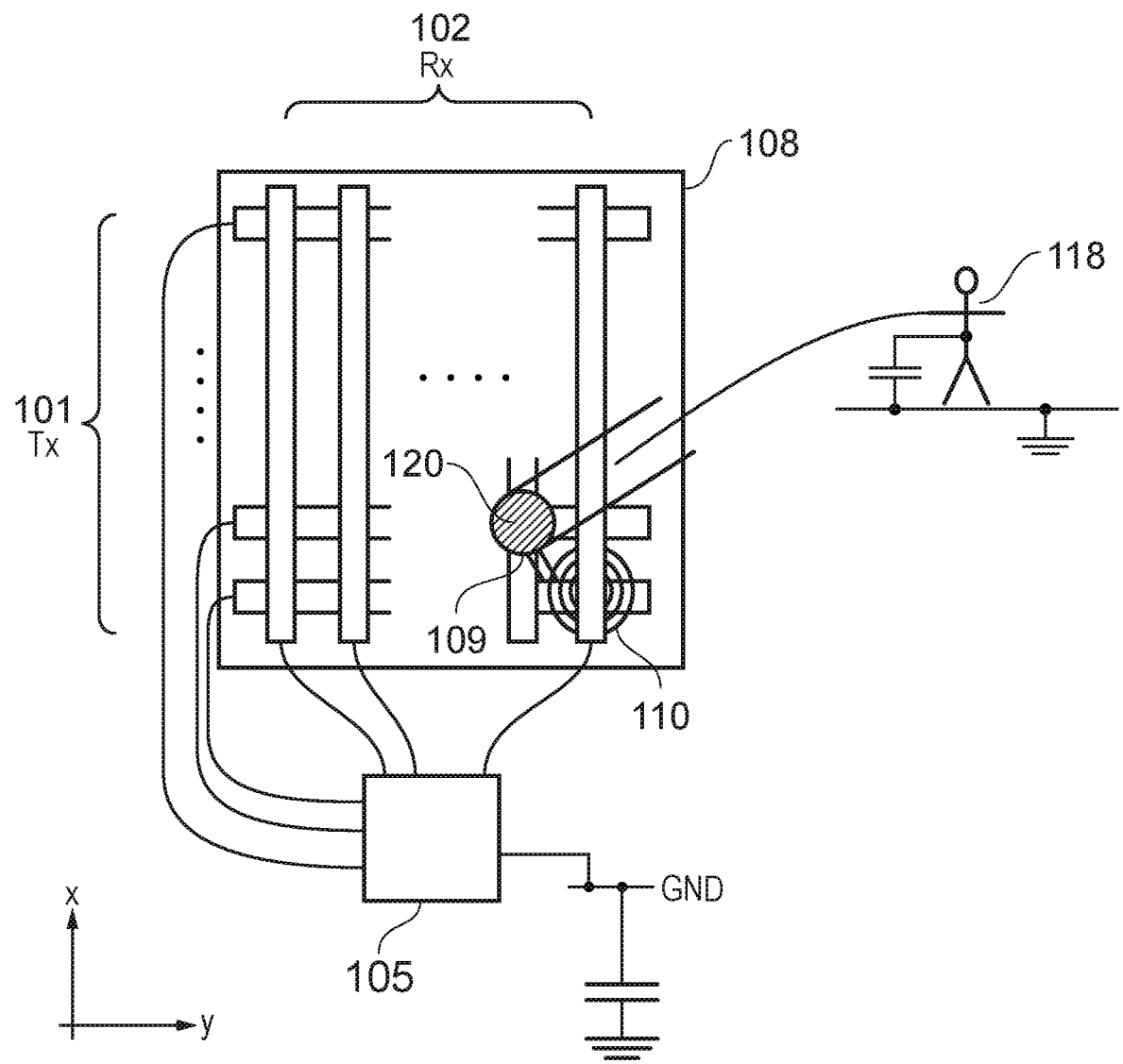
FIG. 3 schematically illustrates a mutual-capacitance measurement mode of the touch sensitive apparatus of FIG. 1, specifically with a view to explaining the principles of mutual capacitance measurement.

A second technique is based on measuring what is frequently referred to as "mutual-capacitance". Reference is made to FIG. 3. In FIG. 3, the measurement circuitry 105 will sequentially stimulate each of an array of transmitter (driven/drive) electrodes, shown as the X electrodes 101 in FIG. 3, that are coupled by virtue of their proximity to an array of receiver electrodes, shown as the Y electrodes 102 in FIG. 3. (It should be appreciated that the Y electrodes 102 may instead be the transmitting electrodes and the X electrodes 101 may instead be the receiving electrodes in other implementations). The resulting electric field 110 is now directly coupled from the transmitter to each of the nearby receiver electrodes; the "free space" return path discussed above plays a negligible part in the overall coupling back to the measurement circuitry 105 when the sensor element 100 is not being touched. The area local to and centred on the intersection of a transmitter and a receiver electrode is typically referred to as a "node" or "intersection point". Now, on application or approach of a conductive element such as a human finger, the electric field 110 is partly diverted to the touching object. An extra return path to the measurement circuitry 105 is now established via the body 118 and "free-space" in a similar manner to that described above. However, because this extra return path acts to couple the diverted field directly to the measurement circuitry 105, the amount of field coupled to the nearby receiver electrode 102 decreases. This is measured by the measurement circuitry 105 as a decrease in the "mutual-capacitance" between that particular transmitter electrode and receiver electrodes in the vicinity of the touch 109. The measurement circuitry 105 senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross, or intersect, within the sensing area of the sensor element 100. The magnitude of a capacitance change is nominally proportional to the area 120 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

As described above, the transmitter electrodes and receiver electrodes in the described implementation are arranged as an orthogonal grid, with the transmitter electrodes on one side of a substantially insulating substrate 103 and the receiver electrodes on the opposite side of the substrate 103. This is as schematically shown in FIG. 3. As in FIG. 2, the first set of transmitter electrodes 101 shown on one side of a substantially insulating substrate 103 and the second set of receiver electrodes 102 is arranged at nominally 90° to the transmitter electrodes on the other side of the substrate 103. In other implementations, the electrodes may be oriented at a different angle (e.g., 30°) relative to one another. In addition, other implementations may have structures where the grid is formed on a single side of the substrate and small insulating bridges, or external connections, are used to allow the transmitter and receiver electrodes to be connected in rows and columns without short circuiting.

There are certain advantages and disadvantages associated with both of the two capacitive sensing techniques described above. Mutual capacitance techniques offer the ability to resolve multiple touches at different locations on the touch-sensitive element. While self-capacitance techniques do not, as a matter of course, provide this functionality, self-capacitance techniques generally output a much stronger signal thus potentially increasing the sensitivity of the touch-sensitive element. In accordance with the principles of the present invention, the measurement circuitry 105 may be configured to operate in either of the self-capacitance and/or mutual capacitance techniques depending on the application at hand.

Figure 4:
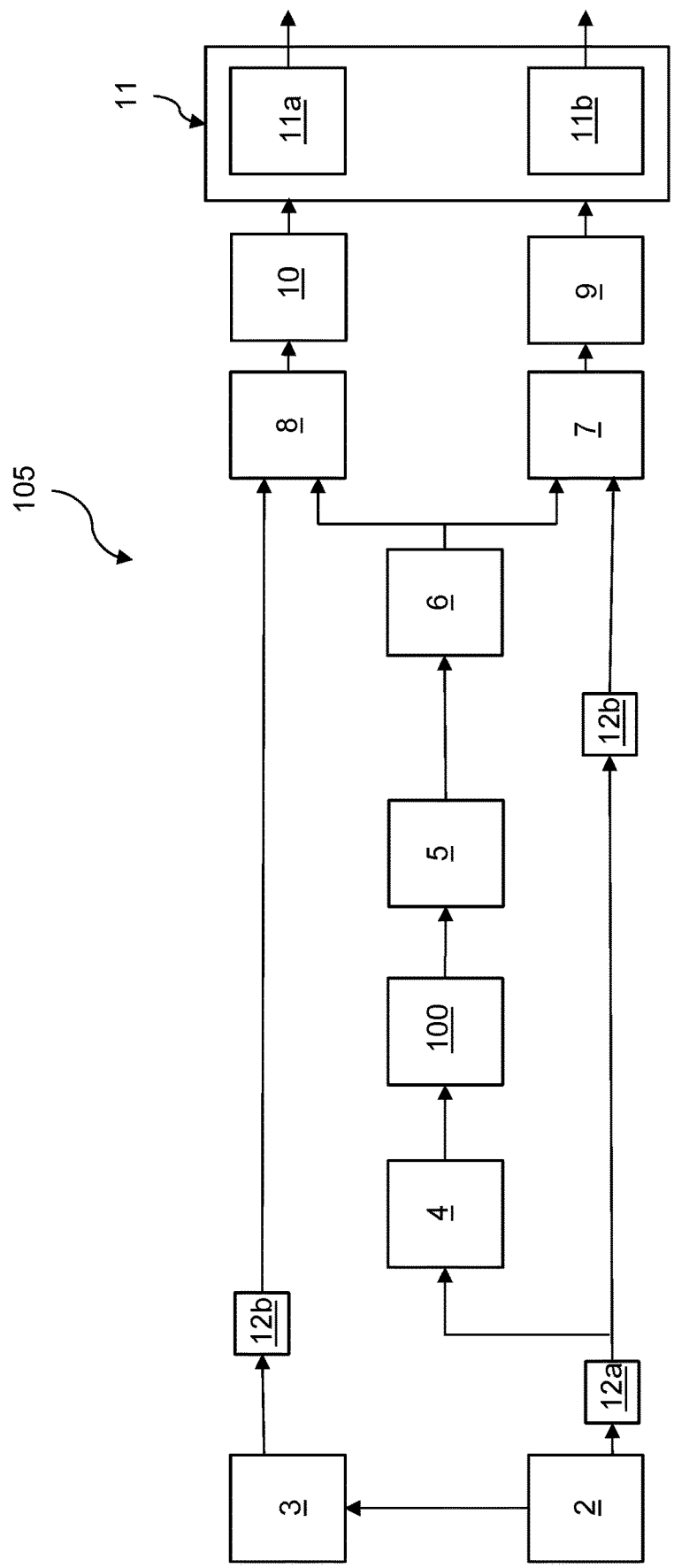
FIG. 4 schematically illustrates the measurement circuitry of the touch sensitive apparatus of FIG. 1 in more detail in accordance with certain embodiments of the invention.

FIG. 4 schematically shows the measurement circuitry 105 in accordance with the principles of the present disclosure in more detail.

The measurement circuitry 105 of FIG. 4 comprises a first digital signal generating module 2, a second digital signal generating module 3, a digital to analogue converter (DAC) 4, an amplifier 5, an analogue to digital converter (ADC) 6, a first multiplier module 7, a second multiplier module 8, a first accumulator 9, a second accumulator 10, and a calculating module 11. The measurement circuitry 105 may also comprise optional window imparting modules 12a and 12b. Additionally shown in FIG. 4, in highly schematic form is sensor element 100. The sensor element 100 does not form part of the measurement circuitry 105 as such, but instead the measurement circuitry 105 is configured to couple to the sensor element 100. In some implementations, the measurement circuitry 105 and the second element 100 may be integrally formed.

Not shown in FIG. 1 is the control circuitry 106 which, as described above, may send control signals to the components of the measurement circuitry 105 (such as the first and second digital signal generating modules 2, 3, first and second multiplier modules 7, 8, first and second accumulators 9, 10, and calculating module 11). The control circuitry 106 also receives the output from calculating module 11.

The first digital signal generating module 2 is configured to generate a first digital signal. The first digital signal is representative of a sinusoidal wave, and in the described implementation, the sinusoidal wave has a single frequency component.

Accordingly, the term "digital signal" as used herein should be understood to encompass a signal which may take one of a plurality of finite levels (or discrete values) at any given time. This of course is in contrast to an analogue signal which represents a continuous range of values. Each of the discrete values of the digital signal may be represented in an appropriate way, for example each discrete value may be represented by a binary or hex code. The "code" herein is generally referred to as a "digital code" to encompass the fact the code could be represented digitally in one of a number of ways, e.g., binary or hex code. Accordingly, as used herein, reference to an "n-bit" digital signal refers to a digital signal that includes an n-bit digital code that represents one of the plurality of discrete values. That is, each of the discrete values may be represented by a specific number of bits; e.g., a 3-bit binary code may represent any one of $2^3$ (i.e., 8) discrete values. Generally, the greater the number of discrete values to choose from, the greater the possibility of more accurately approximating a continuous analogue signal, such as the sinusoidal analogue wave. In some implementations, a 16-bit digital signal is used, meaning that one of $2^{16}$ (i.e., 65,536) discrete values may be represented by the digital signal at any given moment in time. The digital signal may be thought of as a sequence of digital codes, and thus one or more of the digital codes may be considered to be a portion of the digital signal.

The skilled person will appreciate, however, that any suitable way of representing the digital signal may be employed in accordance with the principles of the present disclosure.

The first digital signal generating module 2 may be provided with any suitable components required to generate and output the first digital signal representing the sinusoidal wave. For example, the first digital signal generating module 2 may comprise a continuous digital sequence e.g., of n-bit binary codes or other suitable codes, each representing one of a series of discrete values located in a memory or the like (i.e., a pre-stored sequence of codes representing the discrete values as a function of time). In the described implementation, the first digital signal is a 16-bit binary digital signal. The first digital signal generating module 2 therefore comprises 16 separate output lines (not shown), each able to output one of a "1" (e.g., when a voltage pulse is applied to the output line) or a "0" (e.g., when a voltage pulse is not applied to the output line) at any given time to output binary codes representing one of the $2^{16}$ possible discrete values. It should be appreciated that the digital signal may be any suitable number of bits and correspondingly the first digital signal generating module 2 may comprise a corresponding number of output lines.

The first digital signal generating module 2 may be configured to output the coded sequence at a predetermined rate to generate the first digital signal. The first signal generating module 2 may comprise or receive an output from a clock or oscillator (e.g., associated with a (micro)processor or the like) and be able to reference a look-up table or the like which defines timings at which to output certain codes representing one of the plurality of discrete values. For example, the control circuitry 106 may comprise a (micro)processor and for each clock cycle of the (micro)processor, the first signal generating module 2 is controlled to output one code (e.g., one n-bit binary code) associated with the corresponding discrete value to be output for that clock cycle in accordance with a predefined coded sequence. In some implementations, for example, the clock cycle may be 32 MHz, meaning that one n-bit code (such as a 16-bit binary code) is output around once every 30 ns.

Alternatively, the first digital signal generating module 2 may comprise or receive an output from an oscillator that oscillates at a fixed frequency, and subsequently convert the oscillated signal into a digital representation of said oscillating signal (e.g., using an analogue to digital converter). The skilled person will appreciate that there technique for generating the first digital signal is not significant to the principles of the present disclosure and as such any suitable technique may be implemented in accordance with the principles of the present disclosure.

The second digital signal generating module 3 is configured to generate a second digital signal. As with the first digital signal, the second digital signal is also representative of a sinusoidal signal and, more particularly, is representative of the same sinusoidal wave that the first digital signal is representative of, but is phase shifted. That is, the sinusoidal wave represented by the second digital signal has the same frequency and the same or similar amplitude as the sinusoidal wave represented by the first digital signal but a different phase. More specifically, the sinusoidal wave represented by the second digital signal is orthogonal to the sinusoidal wave represented by the first digital signal.

In the described implementation, the phase shift is set to be 90°. That is, the second digital signal is phase shifted by 90° relative to the first digital signal. Hence, assuming the sinusoidal waves have an angular frequency of w, the sinusoidal wave represented by the first digital signal can be expressed by the function $\sin(\omega t)$ and the sinusoidal wave represented by the second digital signal can be expressed by the function $\cos(\omega t)$. The first digital signal may be referred to as the "in phase" or "I" signal and the second digital signal may be referred to as the "quadrature" or "Q" signal, which offers some advantages in the digital processing as described in more detail below.

The second digital signal generating module 3 may be provided with any suitable components required to generate the second digital signal representing the sinusoidal wave, as described above in respect of the first digital signal generating module 2. For example, in the described implementation, the second digital signal is a 16-bit binary digital signal, and the second digital signal generating module 3 comprises 16 separate output lines (not shown) in a similar manner to the first signal generating module 2. It should be appreciated that the digital signal may be any suitable number of bits and correspondingly the second digital signal generating module 3 may comprise a corresponding number of output lines. The second digital signal generating module 3 may be configured to output the coded sequence at a predetermined rate to generate the second digital signal, e.g., in accordance with the clock cycle of a (micro)processor as descried above in relation to the first digital signal.

In some examples, the second digital signal generating module 3 may operate largely independent of the first digital signal generating module 2 to generate and output the second digital signal. However, as shown in FIG. 4, in some implementations the second digital signal generating module 3 may be configured to receive information from the first digital signal generating module 2 and generate the second digital signal on the basis of the received information. For example, the second digital signal generating module 3 may receive the first digital signal and use a look up table that maps the discrete values represented by a digital code (i.e., an n-bit binary code) of the first digital signal to a phase shifted discrete value represented by another digital code in accordance with the abovementioned mapping. In other words, the second digital signal generating module 3 may effectively shift the digital code of the first digital signal to another digital code representing a phase shifted value of the sinusoidal wave. Any suitable technique for generating the second digital signal on the basis of the information received from the first digital signal generating module 2 may be implemented in accordance with the principles of the present disclosure.

In addition, the first and second digital signal generating modules 2, 3, may be synchronised so as to output the respective digital signals at substantially the same rate. More specifically, the control circuitry 106 is configured to cause the first and second digital signal generating modules 2, 3 to each output a corresponding digital (e.g., binary) code at, and for the duration of, one clock cycle of the micro (processor) of the control circuitry 106.

Although the first and second digital signal generating modules 2, 3 are shown as separate components in FIG. 4, the first and second digital signal generating modules 2, 3, may be implemented by a single electronic component/circuitry. The first and second digital signal generating modules 2, 3, may collectively be referred to as a digital signal generating module.

Referring back to FIG. 4, the first digital signal is output from the first digital signal generating module 2 and is sent to two different locations or along two different branches of the circuit. The first branch includes the DAC 4, sensor element 100, amplifier 5 and ADC 6, while the second branch includes the first multiplier 7.

Taking the first branch first, the first digital signal is passed to the DAC 4 (via optional window imparting module 12*a*). The DAC 4 is configured to convert the first digital signal to an analogue drive signal capable of being applied to an electrode 101, 102 of the electrode array of the sensing element 100. In essence, the DAC 4 is configured to receive the sequence of digital codes output from the first signal generating module 2 representing the sequence of discrete values of the digital signal and convert these discrete values into a smooth analogue signal representing a physical quantity, which in this case is a voltage. The DAC 4 may for instance assign each of the discrete values of the digital signal to a given voltage level at a given time in accordance with the timings of the first digital signal. This provides a series of voltage points over time. The DAC 4 may use suitable interpolation techniques, e.g., using a reconstruction filter, to "fill in" the spaces between the series of voltage points to generate a smooth and continuous voltage.

Of course, it should be appreciated that digital to analogue conversion (and indeed analogue to digital conversion) can introduce what are known as quantization errors. When mapping an analogue signal to a series of discrete values, an algorithm or set of rules is used to determine which value to use at a given moment in time to represent the value of the analogue signal at that time. For instance, an ADC may sample the analogue signal once every 30 ns (in accordance with a certain sample rate) and determine which discrete value to assign for a corresponding 30 ns period in the digital signal based on the sampled analogue value at that time. Accordingly, this means that a range of analogue values correspond to a single discrete value. The impact of quantization errors can be reduced by having a faster sample rate and/or by increasing the number of available discrete values/bits. However, ADCs/DACs having faster sample rates and increased bits tend to be more expensive, and thus depending on the application at hand, a compromise between cost and accuracy can be made.

The DAC 4 in FIG. 4 may comprise any suitable DAC capable of converting the first digital signal to an analogue voltage signal.

In accordance with the described implementation, the DAC 4 may comprise, or operate in association with, a digital noise-shaping sigma-delta converter. The digital noise-shaping sigma-delta converter is used to convert the first digital signal into a one-bit serial digital output, based on the change (the delta) in the first digital signal. The digital noise-shaping sigma delta converter essentially samples the first digital signal at a high frequency (sometimes referred to as oversampling, where the frequency is substantially above the Nyquist rate). The delta is encoded as a series of pulses where the number and frequency of the pulses is proportional to the change. The series of pulses may then be sent to a single-bit DAC having a high bandwidth which converts the single bit-stream into an analogue signal. For example, this may comprise modulating an output voltage on the basis of the one-bit digital signal, akin to a pulse width modulation approach. Such an approach has been found to produce an analogue drive voltage signal with reduced noise in the spectral band occupied by the sinusoidal wave of the first digital signal.

It should be appreciated that a single bit DAC 4 is a non-limiting example of a suitable DAC 4 and, depending on the specifics of the application at hand, any suitable DAC may be employed as the DAC 4 in the measurement circuitry 105.

The analogue voltage signal output by the DAC 4 is subsequently applied to the sensor element 100, or more specifically, to the electrodes 101 and 102. The analogue voltage signal output by the DAC 4 may be referred to as an analogue drive signal. The sensor element 100 is effectively an impedance to be measured, which may be influenced by a number of factors including the presence of a touch 109.

As described above, the technique by which the touch-sensitive apparatus 1 detects changes in capacitive coupling may be the self-capacitance technique and/or the mutual capacitance technique. Accordingly, in the self-capacitance technique, the analogue voltage signal output by the DAC 4 is applied to an electrode of the electrode array and a corresponding parameter indicative of the self-capacitance of the electrode (such as a current) is able to be obtained. In the mutual capacitance technique, the analogue voltage signal output by the DAC 4 is applied to an electrode of the electrode array, e.g., a transmission electrode 101, and a corresponding parameter indicative of the mutual capacitance between the transmission electrode 101 and a receiving electrode 102 (such as a current) is able to be obtained. The operation of the sensor element 100 is explained in more detail above and is not repeated here for conciseness.

In any case, the specifics of the operation of the sensor element 100 is not of primary concern in respect of the present disclosure. What is significant is that the output from the sensor element 100 is an analogue signal (e.g., a current) which is based on the analogue drive signal output by the DAC 4. The output/received analogue signal therefore, broadly speaking, has the same form as the sinusoidal wave represented by the first digital signal. That is, the received analogue signal is a sinusoidal wave having the same frequency as the sinusoidal wave represented by the first digital signal.

As described above, the parameter indicative of a capacitive coupling may alter in the presence of a touch 109 and this generally manifests itself as a change in the amplitude of the sinusoidal wave. For example, in the mutual capacitance technique, in the presence of a touch 109, the capacitive coupling between the transmission electrode 101 and the reception electrode 102 decreases, and thus the received analogue signal is a sinusoidal wave having a reduced magnitude as compared to the sinusoidal wave of the analogue drive signal. In an ideal scenario, this is the only factor that affects the amplitude of the received analogue signal. However, in practical terms, there are likely to be sources of noise (typically at different frequencies) from external sources and/or inherent interaction with different components of the touch sensitive apparatus which affect the received analogue signal. Sources of noise may alter the phase and/or amplitude of the received analogue signal.

Referring back to FIG. 4, the received analogue signal is first passed through amplifier 5, and from amplifier 5 to ADC 6 (via optional window imparting module 12*b*).

The amplifier 5 may be any suitable amplifier configured to amplify the received analogue signal. In the described implementation, the amplifier 5 is a transimpedance amplifier (TIA) configured to convert the received analogue current signal into a voltage signal. Commonly, ADCs convert an analogue voltage to a digital signal, and thus the amplifier 5 is used to convert the received current signal to a voltage signal for processing at the ADC 6. In some implementations, the amplifier 5 may not be necessary.

The amplified analogue voltage signal output from the amplifier 5 is passed to the ADC 6. The ADC 6 is broadly configured to work in a similar manner to the DAC 4 but in reverse. That is, the ADC 6 converts the received analogue voltage signal into a digital signal. The output of the ADC 6 is therefore a digital signal representing the received analogue signal output from the sensor element 100. The digital signal output by the ADC 6 is herein referred to as the received digital signal as it is a digital representation of the received analogue voltage signal. As should be appreciated in light of the above description, the received digital signal has encoded within it a sinusoidal component that is related to the sinusoidal wave represented by the first digital signal. The ADC 6 may be configured to output any suitable digital signal. The ADC 6 in FIG. 4 may comprise any suitable ADC capable of converting the received analogue voltage signal to the received digital signal.

In some implementations, the ADC 6 may output a multi-bit digital signal by assigning discrete values to the received analogue voltage signal. In some examples, the ADC 6 is configured to sample the received analogue voltage signal at a sampling frequency, and subsequently quantise the sampled values into one of a plurality of discrete values. This general approach to analogue signal processing may more conventionally be known as pulse code modulation. The set of discrete values the ADC 6 may assign may be the same set of discrete values used by the first and second digital signal generating modules 2, 3. In alternative implementations, however, the number of discrete values used by the ADC 6 (that is, the number of bits of the digital signal output by the ADC 6) may be different to the number of discrete values used by the digital signal generating modules 2 and 3 (that is, the number of bits of the digital signal output by the digital signal generating modules 2 and 3). Generally, ADCs that output a lower-bit digital signal are easier and cheaper to implement than ADCs that output a higher bit signal but are generally of a lower resolution. Thus, a balance may be struck between cost/efficiency and resolution of the signal for the specific application at hand.

In other implementations, the ADC 6 may output a single or one-bit digital signal. In this regard, the one-bit digital signal may encode the relative magnitude of the received analogue signal at any given time by the number of single bits output in a given time period of the one-bit digital signal (or in other words, the frequency of the output bits). Using a single-bit converter to output a single or one-bit digital signal may be easier and cheaper to implement than a multi-bit converter. To add some resolution, the single-bits may be output at a higher frequency. The inventors have found that a suitable ADC 6 for the described implementation is a sigma-delta ADC configured to output a serial one-bit signal as the received digital signal. A sigma-delta ADC firstly performs a delta modulation, which effectively encodes the change in the received analogue signal between two points rather than the absolute value of the received analogue signal. The sigma-delta ADC comprises an analogue modulator that samples the analogue signal and produces a serial stream of bits (a one-bit or one bit level output). This is done at a high sample frequency (sometimes referred to as oversampling, where the frequency is substantially above the Nyquist rate) in order to increase the resolution of the final digital signal output by the ADC. The frequency of the bits in the serial one-bit data stream is proportional to the change in the analogue signal (the delta). More specifically, over a given time period, the frequency of "1"s and "0"s dictates how much the signal increases or decreases from its previous value. For example, for a sequence of six binary outputs, the sequence of "010101" represent no change in the amplitude of an analogue signal, whereas "111111" represents a maximum change in the positive direction of the analogue signal (i.e., an increase in the amplitude form a previous reference point) and "000000" represents a maximum change in the negative direction of the analogue signal (i.e., a decrease in the amplitude form a previous reference point). Hence, the one bit digital signal can be used to represent the received analogue signal.

In some sigma-delta ADC converters, the sigma-delta converter comprises a digital filter which converts the stream of bits into an multi-bit output digital signal taking one of a plurality of discrete values in a process known as decimation. However, the inventors have found that outputting the serial one-bit data stream as the received digital signal directly output to the first and second digital multiplier modules 7 and 8 is particularly suitable. That is, the described example directly outputs a serial one-bit digital signal to the multiplier modules 7 and 8. Broadly speaking, the sigma-delta ADC utilises a one-bit converter to produce a high frequency, low resolution bit stream encoding the change in amplitude of the received analogue voltage signal. It is easier and more cost effective to implement a single bit converter rather than a multi-level converter. The sigma-delta ADC 6 is controlled to output one bit at a frequency of once every clock cycle of the (micro)processor of the control circuitry 106.

It should be appreciated, however, that in some implementations, the sigma-delta ADC may also be configured to convert the serial one-bit data stream to a multi-bit digital signal before sending to the multiplier modules 7 and 8 using, e.g., a digital filter. It should also be appreciated that other sigma delta converters, e.g., that output a 3-bit digital signal (instead of a 1-bit digital signal) may also be used in accordance with the principles of the present disclosure.

It should be appreciated that a sigma-delta ADC is a non-limiting example of a suitable ADC and, depending on the specifics of the application at hand, any suitable ADC may be employed as the ADC 6 in the measurement circuitry 105.

Figure 5:
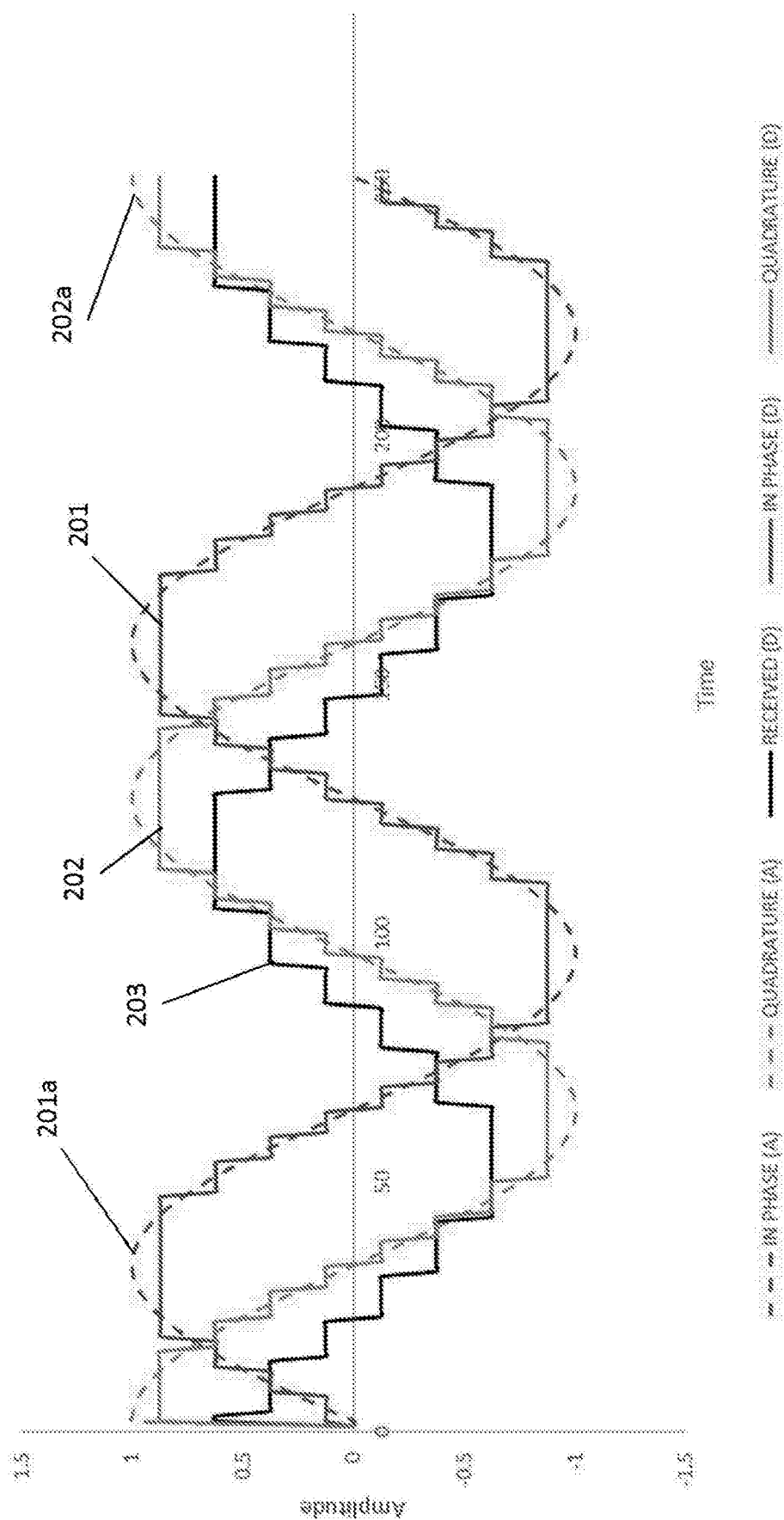
FIG. 5 is a graph of example digital signals expected to be generated when using the measurement circuitry of FIG. 4 for explaining the digital signals in accordance with certain embodiments of the invention.

FIG. 5 is a graphical representation of the digital signals described above. FIG. 5 shows amplitude (of the digital signals) on the y-axis as a function of time along the x-axis. The units of amplitude and time are arbitrary and indeed FIG. 5 should be understood not to comprise data obtained from a practical implementation of the measurement circuitry 105 but instead to comprise data relating to a theoretical example for the purposes of illustrating some of the principles of the present disclosure.

The solid lines in FIG. 5 represent the digital signals, or rather the discrete values as a function of time that the digital signal represents. In particular, the blue solid line 201 represents the first digital signal (or the in phase digital signal) labelled as IN PHASE (D) in FIG. 5, the orange solid line 202 represents the second digital signal (or the quadrature digital signal) labelled as QUADRATURE (D) in FIG. 5, and the black solid line 203 represents the received digital signal labelled as RECEIVED (D) in FIG. 5. Also shown on FIG. 5 by the dashed lines are the analogue sinusoidal waves that the first and second digital signals represent. More specifically, the blue dashed line 201a represents the sinusoidal wave on which the first digital signal is based labelled as IN PHASE (A) in FIG. 5, and the orange dashed line 202a represents the sinusoidal wave on which the second digital signal is based labelled as QUADRATURE (A) in FIG. 5.

As described above, the digital signals 201 to 203 are a series of discrete values (specifically 8 in this example, and so this represent a 3-bit digital signal) and are selected so as to represent sinusoidal waves with as minimal error as is possible. It should be appreciated that the mid-point of the sinusoidal waves that the digital signals broadly follow are shown as being along the zero (horizontal) line in the amplitude axis such that the sinusoidal signal varies between positive and negative values. Thus, in the described implementation, the digital codes representing the discrete values of the sinusoidal wave are effectively signed; that is, the digital codes representing the discrete values below the zero (horizontal) line are treated as though the discrete value is negative, while the digital codes above the zero (horizontal) line are treated as though the discrete value is positive. The first and second digital signals may be attributed a sign when they are output by the digital signal generating modules 2, 3 or the multiplier modules 7, 8 may be configured to attribute a sign to the digital code once it is received at the multiplier module (for example, for a 3-bit digital signal, when the first of the three bits is "0", the signal is treated as negative (e.g., 000, 001, 010, 011), whereas when the first of the three bits is "1" the signal is treated as positive (e.g., 100, 101, 110, 111). Thus, the multiplier modules 7, 8 may comprise a suitable module to apply a sign to the received digital code which is subsequently used in the multiplication process in the multiplier modules 7, 8 described below. It should be appreciated that, in practical terms, the drive voltage is always likely to be positive, and in fact in some practical implementations the DAC 4 will modulate a reference DC voltage between a voltage greater than zero and an upper voltage.

Referring back to FIG. 4, the received digital signal is output from the ADC 6 to the first and second multiplier modules 7 and 8. The multiplier modules 7 and 8 may be largely identical and differ only in the inputs received by the multiplier modules 7 and 8. As shown in FIG. 4, the first multiplier module 7 is configured to receive the first digital signal output from the first digital signal generating module 2 and the received digital signal output by the ADC 6. The second multiplier module 8 is configured to receive the second digital signal output from the second digital signal generating module 3 and the received digital signal output by the ADC 6.

Accordingly, the first and second multiplier modules 7 and 8 are each configured to multiply their corresponding inputs together. That is, the first multiplier module 7 is configured to multiply the first digital signal and the received digital signal, while the second multiplier module 8 is configured to multiply the second digital signal with the received digital signal.

Broadly speaking, the multiplier modules 7, 8 may be configured to multiply corresponding codes of the respective digital signals together. Broadly speaking, the first multiplier module 7 is configured to multiply values of the first digital signal 201 and the received digital signal 203 together at corresponding points in time and the second multiplier module 8 is configured to multiply values of the second digital signal 202 and the received digital signal 203 together at corresponding points in time.

In the example described in FIG. 4, the received digital signal is a serial one-bit digital signal output by the sigma-delta ADC 6 at a frequency of one bit every clock cycle of the (micro)processor of the control circuitry 106. The one-bit digital signal takes values of "0" or "1", as described above, so for each clock cycle outputs a value of "0" or "1". As described above, the first digital signal comprises a digital code comprising n-bits (e.g., 16-bits) output for each clock cycle of the (micro)processor. The first multiplier module 7 is configured to correspondingly multiply each bit of the n-bits of the digital code of the first digital signal output for a given clock cycle with a multiplication factor based on the corresponding bit output from the sigma-delta ADC 6 for that clock cycle. More specifically, the multiplication factor is either a value of "1" or "−1", where the value "1" is used when the value "1" is output by the sigma-delta ADC and the value "−1" is used when the value "0" is output by the sigma-delta ADC 6. Additionally, the multiplier module 7, 8 incorporates the sign attributed to the digital code as mentioned above in the multiplication process. The result of the multiplication is output to the first accumulator 9.

Correspondingly, the second multiplier module 8 correspondingly multiplies each bit of the n-bits of the digital code of the second digital signal output for a given clock cycle with a multiplication factor based on the corresponding bit output from the sigma-delta ADC 6 that clock cycle and the sign attributed to the digital code. The result of the multiplication is output to the second accumulator 10.

It should be appreciated, however, that this is just an example of how the multiplication of two digital signals is performed, and that any suitable mechanism may alternatively be employed. For example, the multiplication of two, multi-bit digital codes representing discrete values of the first/second digital signals 201, 202 and the received digital signal 203 may be multiplied together and passed to the accumulators 9, 10.

In accordance with the principles of the present disclosure, the multiplier modules 7, 8 are digital multipliers. The present inventors have identified that the use of digital multipliers in the context of capacitive touch sensors offers several advantages. While FIG. 5 shows the digital signals 201 to 203 as a curves corresponding to certain amplitudes, as described above, the actual digital signals 201 to 203 that are transmitted between the components of the measurement circuitry 105 using digital code (binary or hex) representations of the individual discrete values. This allows for the implementation in hardware or software of a variety of digital multipliers that may operate according to any suitable digital/binary multiplication techniques.

For example, in one implementation, the digital multiplier modules 7, 8 implement a "shift and add" architecture to allow for the relatively rapid multiplication of two binary values using, for example, an interconnected series of adders. Other more advanced techniques, such as the Baugh—Wooley algorithm or Wallace trees, may also be utilised in accordance with the present disclosure. The skilled person will appreciated that any suitable digital multiplier module 7, 8 may be used in accordance with the present disclosure and the specific type of digital multiplier module selected may depend on a variety of factors including the format of the received digital signal and the first and second digital signals.

One of the main advantages of the digital multiplier modules over their analogue counterparts is that precise control may be given over the multiplication (in other words, only one of a number of expected values can be output), whereas analogue multipliers can, in principle, output a wide range of values. Such modification allows for better control, but may also reduce costs, power consumption and footprint within the electronics.

With reference back to FIG. 4, the first and second multiplier modules 7, 8 are configured to output the respective plurality of multiplied values to the first accumulator 9 and second accumulator 10 in accordance with each clock cycle. The first accumulator 9 is configured to accumulate (sum) the plurality of multiplied values output by the first multiplier module 7. In this regard, the first accumulator 9 sums the plurality of multiplied values output by the first multiplier module 7 over a predetermined time period, corresponding to a number (e.g., thousands) of clock cycles, essentially providing a cumulative total of the multiplied values with time. As should be appreciated, in the described implementation, the accumulators may effectively sum each individual multiplication result both for a given clock cycle and for sequential clock cycles. That is, the accumulators 9, 10 may sum each of the n-bits resulting from the multiplication of each of the n-bits of the digital code representing a discrete value of the first/second digital signal with the single-bit output (or multiplication factor associated therewith) from the ADC 6, and adds to this the results from the next subsequent multiplication for the next clock cycle, and so on. The predetermined time period may be any suitable length of time but generally a balance may be struck between the responsiveness of the system (i.e., how long the system takes to perform one complete set of measurements and, ultimately, identify if a touch is present) versus accuracy. In an example, the predetermined time period may be on the order of thousands to tens of thousands of clock cycles. The first accumulator 9 may be implemented in hardware or software and be arranged to perform suitable addition. The preferred implementations are ones in which the first accumulator 9 performs a sequence of addition taking the result of the previous addition operation and using this as the start for the next addition operation For example, the first accumulator 9 may comprise a series of binary adders configured to add together the output from the first digital multiplier 7.

Equally, the second accumulator 10 is configured in a similar manner to the first accumulator but is instead configured to accumulate the plurality of multiplied values output by the second multiplier module 8. In this regard, the second accumulator 10 sums the plurality of multiplied values output by the first multiplier module 8 over the predetermined time period, essentially providing a cumulative total of the multiplied values with time.

The skilled person will appreciated that any suitable digital accumulator 9, 10 may be used in accordance with the present disclosure and the specific type of digital accumulator selected may depend on a variety of factors including the format and possible number of bits (the available discrete values) of the received digital signal and the first and second digital signals.

Figure 6:
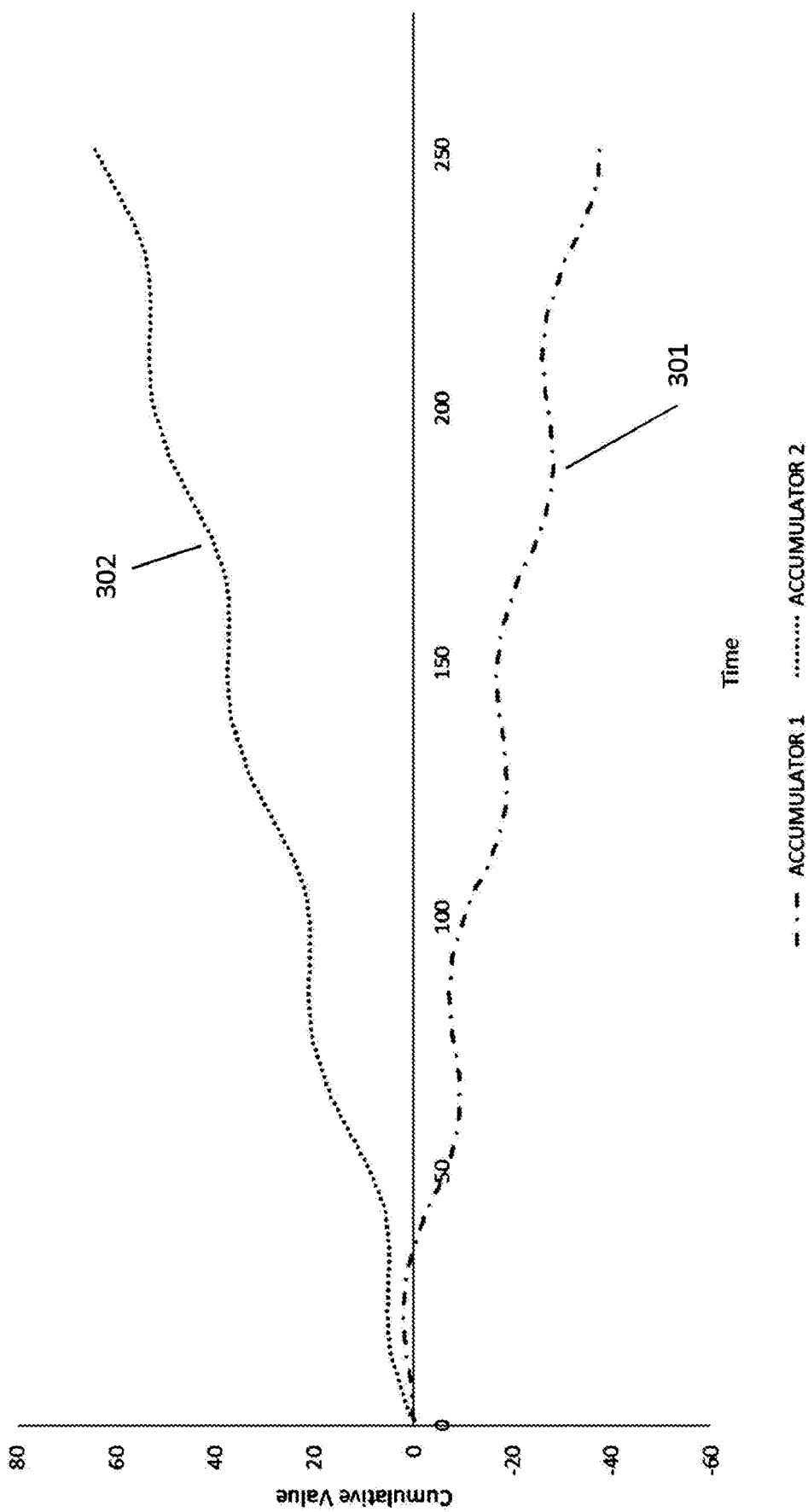
FIG. 6 is a graph of example output from the first and second accumulator of the measurement circuitry in FIG. 4 in accordance with certain embodiments of the invention.

FIG. 6 is a graph showing the cumulative sum of the respective multiplied values output by the multiplier modules 7 and 8 as a function of time for the digital signals 201 to 203 shown in FIG. 5. FIG. 6 shows time, in arbitrary units, along the x-axis and a cumulative value along the y-axis.

FIG. 6 shows the cumulative value 301 over time for the first accumulator 9 (green dot-dashed line) labelled as ACCUMULATOR 1 in FIG. 6, and the cumulative value 302 over time for the second accumulator 10 (blue dashed line) labelled as ACCUMULATOR 2 in FIG. 6. As above, the cumulative value calculated by the first accumulator 9 is the summation of signed digital codes of the first digital signal multiplied by corresponding digital codes (or multiplication factors representing the one-bit output in the case of the sigma delta ADC) of the received digital signal, and the cumulative value calculated by the second accumulator 10 is the summation of signed digital codes of the second digital signal multiplied by corresponding digital codes (or multiplication factors representing the one-bit output in the case of the sigma delta ADC) of the received digital signal.

What the accumulated values show is a measure of a degree of similarity between the received digital signal and the first and second digital signals respectively. When the received digital signal 203 is completely in phase with the first digital signal 201, then the degree of similarity between the first digital signal 201 and the received digital signal 203 is relatively high. More specifically, the summation at the accumulators 9, 10 is large and positive. Conversely, if the received digital signal 203 is completely out of phase with the first digital signal 201 then the degree of similarity is relatively low. More specifically, the summation at the accumulators 9, 10 is large and negative.

Equally, it should be appreciated that the degree of similarity also takes into consideration the relative amplitude of the received digital signal 203 compared to the first and/or second digital signal 201, 202. For instance, the degree of similarity is greater when the amplitudes of the two digital signals are closer to one another (that is, the magnitude of the accumulator values is greater). Thus, a combination of both the relative amplitude and the relative phase to the first digital signal 201 are indicated in the output of the first accumulator 9, and a combination of both the relative amplitude and the relative phase to the second digital signal 203 are indicated in the output of the second accumulator 10. However, generally speaking, the amplitude of the received digital signal 203 affects the measurement performed by both the first and second accumulator in a similar manner (assuming the variation in amplitude remains constant).

With reference to FIG. 5, it can be seen that the received digital signal 203 is more closely aligned with the second digital signal 202. By visual inspection, one can see that the similarity in phase between the received digital signal 203 and the second digital signal 202 is high (i.e., the two are almost in phase with one another), whereas the similarity in phase between the received digital signal 203 and the first digital signal 201 is low (i.e., the two are almost out of phase with one another). That is, the difference in phase is greater between the received digital signal 203 and the first digital signal 201 than with respect to the second digital signal. Referring to FIG. 6, this degree of similarity is seen in the cumulative totals. For instance, after the time 100 in FIG. 6, the difference between the cumulative values 301 and 302 steadily increases with time, with the cumulative value 302 corresponding to the output of the second multiplier module 8 generally being greater, and positive, compared to the cumulative value 301 corresponding to the output of the first multiplier module 7. Indeed, the accumulator value for the output from the first multiplier module 7 (i.e., cumulative value 301) is negative, which can broadly be understood due to the opposite signs on the values that are being multiplied (e.g., when the signal 201 is positive, the received digital signal 203 is negative, and vice versa). Conversely, the accumulator value for the output from the second multiplier module 8 (i.e., cumulative value 302) is positive, which can broadly be understood due to the similar signs on the values that are being multiplied (e.g., when the signal 201 is positive, the received digital signal 203 is negative, and vice versa). Thus, broadly speaking, the accumulator values can be positive and negative depending on the relative phase between the received digital signal and each of the first and second digital signals.

It should be appreciated that the outputs from the accumulator modules 9 and 10 can be thought of as corresponding baseband signals of the received digital signal 203. In principle, any sinusoidal signal can be split (demodulated) into two baseband signals (or conversely any sinusoidal signal can be created using the two baseband signals). As described above, these baseband signals are the in phase, I, signal and the quadrature, Q, signal, where the quadrature Q signal is 90° out of phase with the in phase I signal. The baseband signals can be thought of as representing a "real" and "imaginary" part of a sinusoidal signal, and indeed, this is how periodic sinusoidal waves are presented in some branches of mathematics. Accordingly, the outputs of the accumulators 9, 10 represent a vector which can have any phase between 0 and 360°, when considering the real (I signal) as the x-axis value and the imaginary (Q signal) as the y-axis value on a Cartesian coordinate graph. The process of multiplying the digital signals and accumulating the results essentially performs an IQ demodulation of the received digital signal. The main purpose for performing the parallel in-phase and quadrature paths is to overcome the problem that the phase of the received digital signal will in general be different to the first digital signal due to factors such as different path lengths by which the analogue signals travel in the sensor element 100, the exposure to various filters/amplifiers, and in addition to noise as described above.

Although it is shown in FIG. 4 that the multiplier modules 7 and 8 are separate from the respective accumulator modules 9 and 10, it will be appreciated that the multiplier and accumulator modules may be combined. That is, in some implementations the first multiplier module 7 and the first accumulator 9 are combined into a first multiplier accumulator (MAC) module. Equally, the second multiplier module 8 and the second accumulator 10 are combined into a second multiplier accumulator (MAC) module. Using combined MAC modules may help reduce the complexity of the system as a whole from a control perspective. Again, in accordance with the disclosure above, the MAC modules are configured to receive digital signals and perform processing on the digital signals.

The output from the accumulators 9 and 10 are passed to the calculating module 11. The calculating module 11 comprises a signal magnitude calculating module 11a and an (optional) signal phase calculating module 11b.

The signal magnitude calculating module 11a is configured to take the output from both the first accumulator 9 and the second accumulator 10 and calculate the magnitude of the component corresponding to the sinusoidal wave represented by the first digital signal in the received digital signal. In other words, the signal magnitude calculating module calculates the component of the received digital signal at the same frequency as the first digital signal irrespective of any phase shifts that the received digital signal has experienced. In this regard, the measurement of each individual node or intersection point on the sensor element 100 is expected to result in a received digital signal of unique and unknown phase. Despite this, no uniformity or knowledge of the phases of individual nodes is assumed or required. Instead only the magnitude of the received signal is measured as it is found that this is the quantity that is modified when a human finger is brought into close proximity to each node.

Broadly speaking, the magnitude of the received digital signal is represented by the following formula:

$$M=\sqrt{(I^2+Q^2)},$$

where M represents the magnitude of the component corresponding to the sinusoidal wave represented by the first digital signal in the received digital signal, I represents the accumulated value output by the first accumulator 9 (the in phase accumulated value) and Q represents the accumulated value output by the second accumulator 10 (the quadrature accumulated value).

To implement such a calculation, the signal magnitude calculating module 11a implements a suitable digital calculation algorithm. In the described implementation, the signal magnitude calculating module 11a implements a CORDIC algorithm (Coordinate Rotation Digital Computer). This process takes advantage of the fact that the I and Q signals can be thought of to represent "real" and "imaginary" parts of the digital signal. The basic premise of the algorithm is to perform a series of phase rotations until the "imaginary" part of the signal tends to zero. The "real" part after the rotations hence represents the magnitude of the signal. This process is particularly effective for calculating the magnitude of a digital signal as it only requires the use of addition/adders to rotate the binary/digital number, rather than multipliers, and hence can reduce the footprint of the electronics.

Accordingly, the signal magnitude calculating module 11a outputs an indication of the magnitude M of the capacitive coupling associated with the driven electrode and/or the receive electrode of the electrode array 101, 102. As stated above, the magnitude M varies with the presence or absence of a user's touch 109 (or other object that capacitively couples to the electrode array, such as a stylus). Accordingly, the magnitude M can be output to the control circuitry 106 which is configured to perform suitable processing to determine if a touch 109 is present at the electrode/intersection point in accordance with conventional techniques. For instance, the magnitude M may be compared to a pre-stored value of M for the electrode array or specific electrodes, or the magnitude M may be compared to previously obtained values for the electrode array or specific electrodes. If the difference between the magnitude M and the pre-stored or previously obtained value is sufficiently different, this may be interpreted by the control circuitry 106 as corresponding to a sensed touch 109.

Turning back to FIG. 4, the signal phase calculating module 11b may be provided to calculate the phase shift between the component corresponding to the sinusoidal wave represented by the first digital signal in the received digital signal and the first digital signal. In this regard, the following formula may be used, where Φ is the phase shift expressed in terms of radians:

$$\Phi = \tan^{-1}(Q/I).$$

This angle, Φ, is essentially a mapping of the vector magnitude relative to the in phase signal. As described above, this can be envisaged as the real and imaginary components of the received digital signal. A useful by-product of the above rotations used in the signal magnitude calculating module 11a is that the cumulative number of rotations used to minimise the "imaginary" part of the received digital signal is indicative of the phase φ.

The signal phase calculating module 11b may output, to the control circuitry 106, the angle Φ as a result of performing the CORDIC algorithm above to determine the magnitude. This angle provides a representation of the degree of noise the capacitance measurement has been exposed to. The control circuitry 106 may make use of this information in a number of ways, for example it may be that an external source (for example, another electronic device) is interfering with the capacitance measurements and thus the control circuitry 106 could output an indication to a user of the touch sensitive apparatus 1 to alert the user of this possibility if the angle is significantly large. Additionally, the control circuitry 106 may use the angle Φ to prompt a re-calibration process to take account of the noise. As described, however, this is an optional process and may not be performed in some implementations. The significant quantity, as discussed above, is the magnitude M of the received digital signal which is indicative of the presence or absence of a touch 109.

Figure 7:
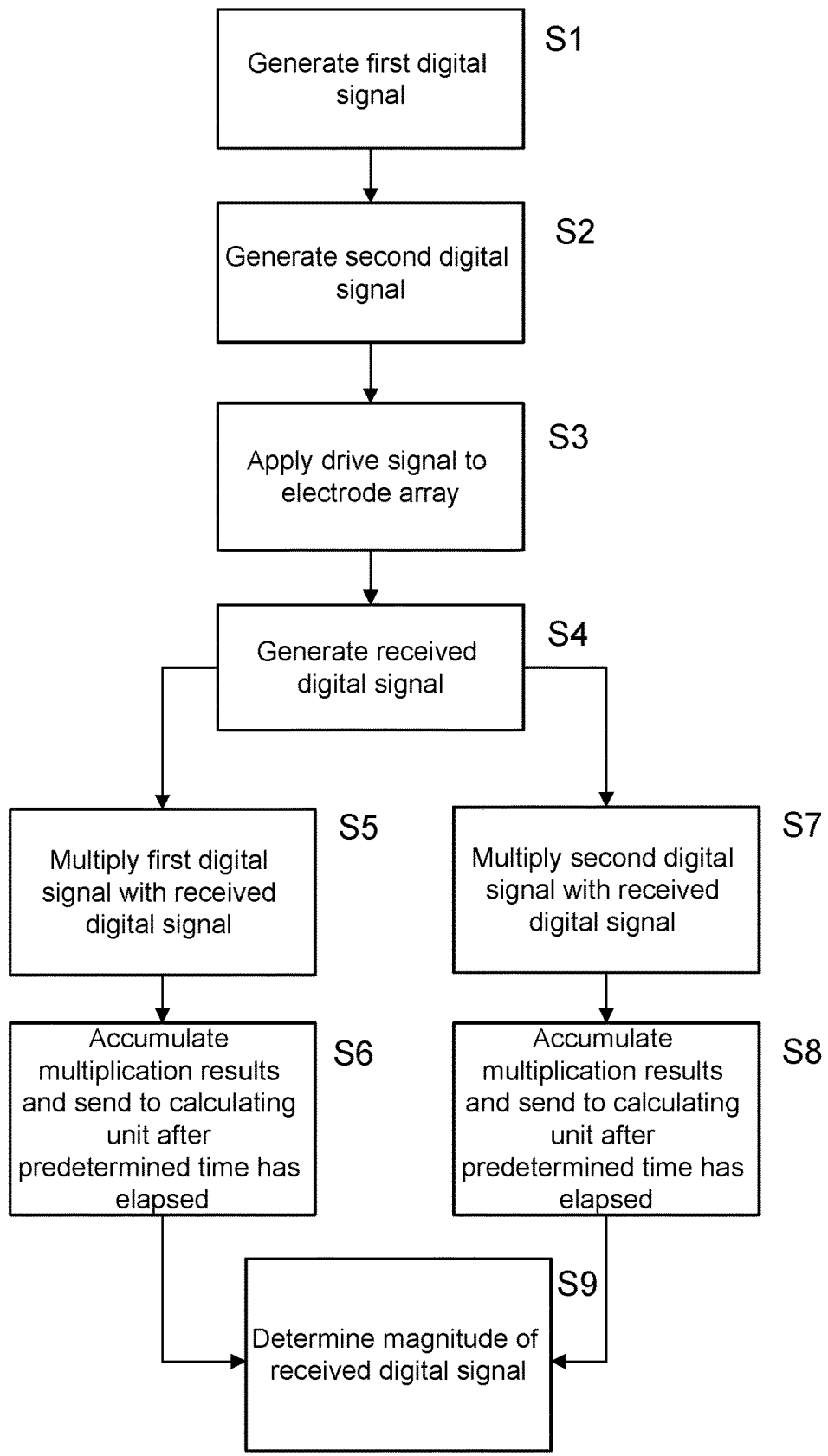
FIG. 7 shows a flow chart depicted method for determining the magnitude of a digital signal received from an electrode array.

Referring now to FIG. 7, FIG. 7 shows flow diagram depicted an example method in accordance with the principles of the present disclosure.

The method starts at step S1 with the generation of the first digital signal using the first digital signal generation module 2, under the control of the control circuitry 106. As specified previously, the first digital signal may be a sequence of digital codes, each digital code corresponding to one of a plurality of finite values. The first digital signal represents a sinusoidal wave of a fixed frequency.

The method proceeds to step S2 with the generation of the second digital signal using the second digital signal generation module 3. The second digital signal is largely the same as the first digital signal, but is phase shifted. More specifically, the second digital signal is phase shifted by 90°. The second digital signal generation module 3 may receive the first digital signal from the first digital signal generation module 2 and use a suitable process (such as mapping the received value to a corresponding value that is shifted by 90° relative to the sinusoidal wave) to generate the second digital signal.

The method the proceeds to step S3 where the first digital signal is applied to the electrode array of the sensor element 100. In this step, the first digital signal is converted to an analogue drive/voltage signal using the DAC 4 as described above. The output from the DAC 4 is a smooth, varying voltage (simulating the sinusoidal waveform used to create the first digital signal). The analogue voltage signal is applied to a selected one of the electrodes of the electrode array in accordance with a particular method for sensing capacitances.

At step S4, the received digital signal is generated. In this step, the analogue drive signal is used in a manner to provide a detectable analogue signal representative of the capacitive coupling of (at least a part of) the electrode array in accordance with the chosen method for sensing capacitances. The received analogue signal obtained from the electrode array is first amplified and converted into a voltage via transimpedance amplifier 5, before then being passed to ADC 6 and converted into the received digital signal. The received digital signal in some implementations may be a binary one-bit bitstream.

The method then proceeds in parallel along steps S5 and S6, and along steps S7 and S8.

At step S5, the first multiplier module 7 receives the first digital signal generated in step S1 and the received digital signal generated in step S4 and multiplies the two together. More specifically, the first multiplier module 7 is configured to use a digital multiplication technique to multiply corresponding portions (digital codes) of the first digital signal and the received digital signal, for example using a shift and add technique. The first multiplier module 7 is configured to repeat the process and output a plurality of results of the multiplication, for example, corresponding to the multiplication of each digital code and/or each bit of the digital code of the respective digital signals.

At step S6, the first accumulator 9 receives the output from the first multiplier module 7 and sum consecutive outputs in a cumulative fashion. The first accumulator 9 is also configured to perform a digital addition to sum together two consecutive outputs from the first multiplier module 7. The first accumulator 9 performs this summation for a predetermined period and, once the predetermined period has elapsed, transmits the result to the calculating module 11. After the predetermined period has elapsed, the first accumulator 9 resets its memory and starts from zero to cumulatively add the results output from the first multiplier module 7.

At step S7, the second multiplier module 8 receives the second digital signal generated in step S2 and the received digital signal generated in step S4 and multiplies the two together. More specifically, the second multiplier module 8 is configured to use a digital multiplication technique to multiply corresponding portions (digital codes) of the second digital signal and the received digital signal, for example using a shift and add technique. The second multiplier module 8 is configured to repeat the process and output a plurality of results of the multiplication, for example, corresponding to the multiplication of each digital code and/or each bit of the digital code of the respective digital signals.

At step S8, the second accumulator 10 receives the output from the second multiplier module 8 and sum consecutive outputs in a cumulative fashion. The second accumulator 10 is also configured to perform a digital addition to sum together two consecutive outputs from the second multiplier module 8. The second accumulator 10 performs this summation for a predetermined period and, once the predetermined period has elapsed, transmits the result to the calculating module 11. After the predetermined period has elapsed, the second accumulator 10 resets its memory and starts from zero to cumulatively add the results output from the second multiplier module 8.

At step S9, the calculating module 11 receives the output from the first and second accumulators 9, 10 at steps S6 and S8 respectively, and under control of the control circuitry 106, determines the magnitude of the received digital signal. More specifically, the calculating module is configured to digitally determine the magnitude of the received digital signal using, for example, a CORDIC algorithm. As described above, the CORDIC algorithm can be implemented in hardware or software that does not require digital/binary multipliers and can instead use digital/binary adders. Performing the CORDIC process by adding a predetermined quantity to the values output by the first and second accumulators 9, 10 iteratively, the magnitude of the received digital signal can be identified. The calculating module 11 may then output the determined magnitude to the control circuitry 106 which is configured to determine the presence or absence of a touch 109 in the vicinity of the electrode array on the basis of the determined magnitude.

Thus, the present disclosure describes a system for obtaining signals from an electrode array/sensing element 100 based on a digital signal and processing the received signals using digital circuitry. While such a process includes, for example, the additional step of converting the received analogue signal into a received digital signal, the present inventors have realised that processing the received signals in the digital domain provides several advantages, not least an improved control over the digital processing, but additionally lower energy requirements and reduce footprint for the electronic components. Thus, the burden of the additional analogue to digital conversion step outweighs the potential advantages.

It has been described above that the sinusoidal waves on which the first digital signal and second digital signal are based are of a single frequency. In some examples, the single frequency is in the range of 25 kHz to 250 kHZ, although it should be appreciated that this is an example only and other frequencies may be used in other implementations. A particularly advantageous reason for using sinusoidal signals of a single frequency is that the majority of the energy applied to the electrode array is in the fundamental frequency. Having multiple frequencies means that the electrode array, which essentially acts as a low-pass filter, causes some of the energy in the higher frequencies to be lost to the system as a whole. In other words, more of the energy is retained when using a single frequency which results in a stronger signal obtained from the electrode array. While, as mentioned, there is the possibility of some additional frequency components being introduced as a result of the quantization errors or the like, these generally speaking would only contain a relatively small fraction of the energy of the overall drive signal.

Referring back to FIG. 4, the measurement circuitry 105 optionally includes window imparting modules 12a and 12b. These modules 12a and 12b are arranged to optionally impart a window function to the respective digital signals. More specifically, a window imparting module 12b is located at the output of the first digital signal generating module 2 and the output of the second digital signal generating module 3, such that the digital signals passed to the first and second multipliers 7 and 8 have the window function applied thereto. A window imparting module 12a is also shown at the output of the first digital signal generating module 2 prior to the digital signal passing to the DAC 4. In principle, the window imparting modules 12a and 12b at the output of the first digital signal generating module shown two possible locations for the window imparting module 12a, 12b. In principle, if the window imparting module 12a is provided, there is no necessity to additionally provide the window imparting module 12b at the output of the first digital signal generating module 2.

A window function is essentially a function which is zero in all areas apart from inside a chosen interval. A suitable window function is the Hann window function, which is approximately a bell curve shape having a maximum value in the middle of the curve and tapering to zero either side of the mid-point. When a window function is applied to a signal, such as the digital signals mentioned above, the window function causes the digital signal to be zero outside of the limits of the window function and provides a packet of the original signal within the limits of the window.

In respect of the window imparting modules 12b, the window function may be applied to the first and second digital signals before they are passed to the first and second multiplier modules 7, respectively. Applying the window function at this point may help to shape or narrow the reception spectrum. This may help prevent any interference by other foreign signals that are spectrally-near to the frequency of the sinusoidal wave that the first digital signal represents in the received analogue signal. When the window imparting modules 12b are employed, the first and second multiplier modules 7, 8 and first and second accumulators 9, 10 may be controlled (by the control circuitry 106) to operate in accordance with the window imparting modules 12b. In other words, the first and second multiplier modules 7, 8 and first and second accumulators 9, 10 may be configured to start operations in response to the instructions being sent to the window imparting modules 12b. Operating in this way may reduce power consumption and also make more efficient use of the memory in the accumulators 9, 10.

In respect of the window imparting module 12a, which as mentioned above is an alternative position for the window imparting module 12b at the output of the first signal generating module 2, the window function may be applied to the first digital signal before it is passed to the DAC 4. Applying the window function at this time shapes the spectrum of the voltages and currents driven through the sensor element 100. While this may help in some aspects with the reduction of noise, one main reason for performing windowing at this time is to reduce the amount of electromagnetic emissions (the drive signal is effectively zeroed outside of the limits of the window).

The above has generally described the measurement circuitry 105 when applied to a single electrode of the electrode array and when a single received analogue signal is received. In practice, and certainly for systems that resolve the X-Y coordinates of a touch, the measurement circuitry 105 will be expected to drive a variety of electrodes of the electrode array and receive a plurality of signals from the electrode array.

Figure 8:
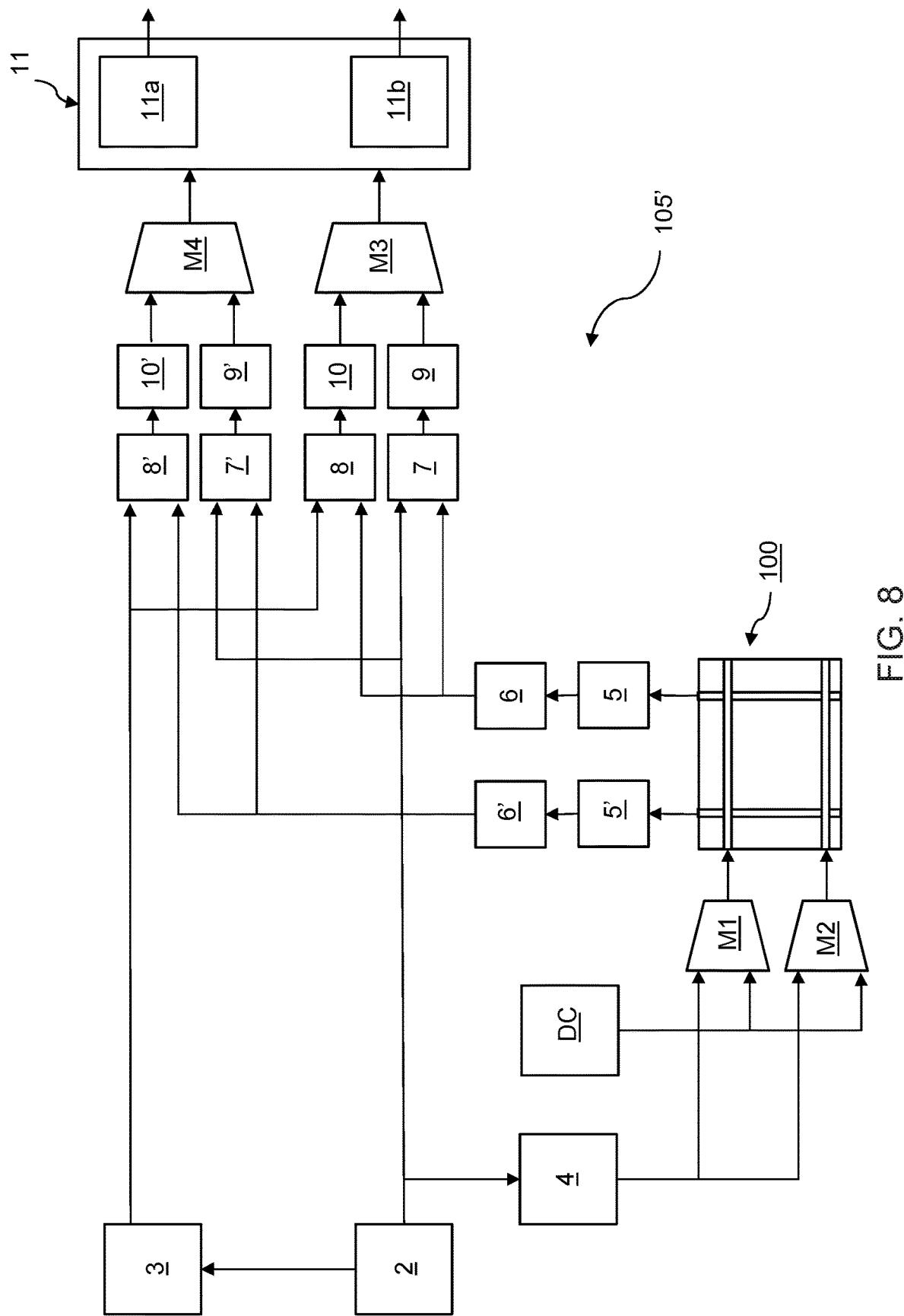
FIG. 8 schematically illustrates the measurement circuitry of the touch sensitive apparatus of FIG. 4 when adapted for use with multiple electrodes of an electrode array in more detail in accordance with certain embodiments of the invention.

FIG. 8 is an example of how the measurement circuitry 105 of FIG. 4 may be extended to accommodate driving multiple electrodes and receive multiple received signals.

FIG. 8 shows measurement circuitry 105' which is largely comprised of components forming the measurement circuitry 105 of FIG. 4. Components that are originally present in measurement circuitry 105 are indicated with the same reference signs, and a specific description of their operation is not repeated herein. In fact, as can be seen, the majority of the components of the measurement circuitry 105 of FIG. 4 have been duplicated as indicated by the components having the same reference signs. The duplicated components are indicated with a prime (') for the purposes of distinguishing like components. The measurement circuitry 105' additionally comprises multiplexers M1 to M4 and a DC source (DC).

As seen in FIG. 8, the sensor element 100 comprises a two-by-two grid of electrodes (two horizontal electrodes coupled to the output of multiplexers M1 and M2 respectively, and two vertical electrodes coupled to the amplifiers 5 and 5' respectively). Broadly speaking, on the receive side of the sensor element 100, it can be seen that there exists an amplifier 5, 5', a ADC 6, 6', a first multiplier module 7, 7' and second multiplier module 8, 8', a first accumulator 9, 9', and a second accumulator 10, 10' for each receive (vertical) electrode.

In operation, the DAC 4 is configured to convert the first digital signal to an analogue drive signal, as discussed before, but in this extended case, the control circuitry 106 is configured to activate the multiplexers M1 and M2 to sequentially drive each of the horizontal electrodes in turn. In this regard, the control circuitry 106 may set multiplexer M1 to apply the analogue drive signal to the electrode connected to multiplexer M1. In this case, the control circuitry 106 may cause multiplexer M2 to connect the DC source (and not the output of the DAC 4). The DC source may be any suitable voltage source that effectively negates or guards the electrode from influencing the measurement of the electrode connected to M1. The potential may be a fixed DC potential, a varying potential, or be a ground connection, depending on the implementation at hand.

Assuming this example operates in the mutual capacitance mode, then it is possible to sense the capacitances at each of the intersection points between electrodes. Assuming as above that M1 is connected to the upper horizontal electrode (as shown in FIG. 8), then the amplifiers 5 and 5' amplify the received analogue signal from the respective vertical electrodes before passing the analogue signal to the received ADCs 6, 6' to produce two received digital signals. In much the same way as described above, the first multiplier module 7 receives the first digital signal and the received digital signal from the right-hand vertical electrode (as shown in FIG. 8) and the second multiplier module 8 receives the second digital signal and the received digital signal from the right-hand electrode. The multiplier modules 7 and 8 thus function in a broadly similar manner as before. Equally, the first multiplier module 7' receives the first digital signal and the received digital signal from the left-hand vertical electrode (as shown in FIG. 8) and the second multiplier module 8' receives the second digital signal and the received digital signal from the left-hand electrode. The multiplier modules 7' and 8' thus function in a broadly similar manner to multiplier modules 7 and 8. However, in this example, there are two received digital signals (from each of the electrodes) that are processed in parallel.

Accordingly, the first and second accumulators 9, 9', 10 and 10' operate in parallel. Namely, the first accumulator 9 accumulates the output from the first multiplier module 7, the second accumulator 10 accumulates the output from the second multiplier module 8, the first accumulator 9' accumulates the output from the first multiplier module 7', the second accumulator 10' accumulates the output from the second multiplier module 8'.

In this regard, however, it should be appreciated that the results from the first and second accumulators 9, 9' and 10, 10' do not necessarily need to be provided at the same time to the calculating module 11. Once the accumulators 9, 9', 10, 10' have accumulated the results from the respective multiplier modules 7, 7', 8, 8' over the predetermined time period, the multiplexers M3 and M4 are used to sequentially output the values from the accumulators 9, 9', 10, 10' to the calculating module 11, e.g., multiplexer M3 is controlled to sequentially provide the values from accumulators 9 and 10 for the calculating module 11 to calculate the magnitude (and optionally phase) of the received digital signal from the right-hand electrode, and thereafter multiplexer M4 is controlled to sequentially provide the values from accumulators 9' and 10' for the calculating module 11 to calculate the magnitude (and optionally phase) of the received digital signal from the left-hand electrode The calculating module 11 can be configured to store the results as and when they are transmitted to the calculating module 11, and the calculating module can perform the CORDIC (or other) calculation accordingly.

Accordingly, if the capacitance at the intersection points along the lower horizontal electrode (as shown in FIG. 8) of the sensing element 100, then the multiplexer M2 is essentially connected to the output of the DAC 4 while the multiplexer M1 is connected to the DC input. The process is repeated as described above, however with the inputs to the amplifiers 5, 5' corresponding instead to the received analogue signal from the lower horizontal electrode.

Hence, by controlling the multiplexers M1 and M2, the digital output of different ones of the receive electrodes (vertical electrodes) can be coupled to the multiplier modules, accumulator modules and the calculating module 11. However, broadly speaking, the determination of the magnitude of the received digital signal is largely as described above in relation to the measurement circuitry 105.

It should be appreciated that the implementation in FIG. 8 can be extended to electrode arrays with a greater number of electrodes simply by duplicating the relevant components and introducing a suitable number of multiplexers.

It has been described above that the first and second digital signals include information representing a sign (i.e., a positive or negative) for a given digital code of the digital signals, or that the digital codes of the digital signals are given a sign in either of the multiplier modules 7 and 8. However, it should be appreciated that in some implementations the digital codes may not include information representing a sign or be given a sign during the multiplication process. In such implementations, however, the accumulator values output from the accumulators 9, 10 will be equal to or greater than 0 (i.e. not negative). In these implementations, the accumulator results may both be subject to an offset before being subjected to, e.g., the CORDIC algorithm in the calculating module. Applying the offset maintains the overall understanding that the accumulator values represent a vector which may take values between 0 and 360 degrees.

Thus there has been described circuitry for calculating the magnitude of a received signal from an electrode of a capacitive touch sensitive apparatus. The circuitry includes a first digital signal generating module configured to generate a first digital signal, the first digital signal representing a sinusoidal wave having a first frequency, and a second digital signal generating module configured to generate a second digital signal, the second digital signal representing a sinusoidal wave having the first frequency, wherein the second digital signal is orthogonal to the first digital signal. The circuitry also includes a sensing module for coupling to an electrode array, the sensing module configured to receive the first digital signal, provide a driving signal to at least one electrode of the electrode array based on the first digital signal, and output a received digital signal, wherein the received digital signal is indicative of a capacitive coupling experienced by the at least one electrode. The circuitry includes a first multiplier module configured to receive the first digital signal and the received digital signal and multiply the two digital signals together; a second multiplier module configured to receive the second digital signal and the received digital signal and multiply the two digital signals together; and a signal magnitude calculating module configured to calculate the magnitude of the received digital signal based on the output from the first multiplier module and the second multiplier module. Also described is a touch sensitive apparatus including the circuitry and a method for calculating the magnitude of a received signal from an electrode of a capacitive touch sensitive apparatus.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. Circuitry for calculating the magnitude of a received signal from an electrode of a capacitive touch sensitive apparatus, the circuitry comprising:
   a first digital signal generator configured to generate a first digital signal, the first digital signal representing a sinusoidal wave having a first frequency;
   a second digital signal generator configured to generate a second digital signal, the second digital signal representing a sinusoidal wave having the first frequency, wherein the second digital signal is orthogonal to the first digital signal;
   sensing circuitry for coupling to an electrode array, the sensing circuitry configured to receive the first digital signal, provide a driving signal to at least one electrode of the electrode array, wherein the driving signal is an analogue signal converted from the first digital signal, and output a received digital signal, wherein the received digital signal is indicative of a capacitive coupling experienced by the at least one electrode;
   a first multiplier configured to receive the first digital signal and the received digital signal and multiply the two digital signals together;
   a second multiplier configured to receive the second digital signal and the received digital signal and multiply the two digital signals together; and
   a signal magnitude calculator configured to calculate the magnitude of the received digital signal based on the output from the first multiplier and the second multiplier.

2. The circuitry according to claim 1, wherein the first multiplier and the second multiplier are digital multipliers configured to use a digital multiplication process to digitally multiply the first or second digital signal respectively with the received digital signal.

3. The circuitry according to claim 1, wherein the first multiplier is configured to multiply a portion of the first digital signal and a portion of the received digital signal that correspond in time, and multiply the corresponding portions of the first digital signal and the received digital signal together, and wherein the second multiplier is configured to multiply a portion of the second digital signal and a portion of the received digital signal that correspond in time, and multiply the corresponding portions of the second digital signal and the received digital signal together.

4. The circuitry according to claim 3, the circuitry further comprising:
   a first accumulator; and
   a second accumulator,
   wherein the first accumulator is configured to sum a plurality of outputs from the first multiplier each corresponding to the multiplication of corresponding portions in time of the first digital signal with the received digital signal over a predetermined period of time,
   wherein the second accumulator is configured to sum a plurality of outputs from the second multiplier each corresponding to the multiplication of corresponding portions in time of the second digital signal with the received digital signal over the predetermined period of time, and
   wherein the first and second accumulators are each configured to output the corresponding summations to the signal magnitude calculator after the predetermined period of time has elapsed.

5. The circuitry according to claim 1, wherein the signal magnitude calculator is configured to calculate the magnitude of the received digital signal using a CORDIC algorithm.

6. The circuitry according to claim 1, wherein the first digital signal and the second digital signal represent a sinusoidal wave having a single frequency.

7. The circuitry according to claim 1, wherein the first digital signal, the second digital signal and the received digital signal are represented using a binary sequence.

8. The circuitry according to claim 1, wherein the circuitry is configured to apply a window function to the first and second digital signals prior to the first and second digital signals being received at the first and second multipliers respectively.

9. The circuitry according to claim 1, wherein the circuitry is configured to apply a window function to the first digital signal prior to the first digital signal being applied to the sensing circuitry.

10. The circuitry according to claim 1, wherein the second digital signal generator is configured to generate the second digital signal based on a sinusoidal wave that is 90° out of phase with the sinusoidal wave used to generate the first digital signal by the first digital signal generator.

11. The circuitry according to claim 1, wherein the sensing circuitry comprises a digital to analogue converter, DAC, and an analogue to digital converter, ADC, wherein the DAC is configured to receive the first digital signal and convert the first digital signal to an analogue signal as the drive signal, and wherein the ADC is configured to receive an analogue receive signal from the electrode array and convert the analogue received signal to the digital receive signal.

12. The circuitry according to claim 11, wherein the ADC is a sigma-delta ADC.

13. The circuitry according to claim 11, wherein the DAC comprises a one-bit DAC.

14. The circuitry according to claim 1, wherein the circuitry further comprises a signal phase shift calculator configured to output the phase shift of the received signal relative to the first digital signal based on the output from the first multiplier and the second multiplier.

15. The circuitry according to claim 1, wherein the circuitry comprises a third multiplier configured to receive the first digital signal and a second received digital signal and multiply the two digital signals together; and a fourth multiplier configured to receive the second digital signal and the second received digital signal and multiply the two digital signals together, wherein the second received digital signal is a digital signal received from a different electrode of the electrode array than the received digital signal, and wherein the signal magnitude calculator is configured to calculate the magnitude of the received signal based on the output from the first multiplier and the second multiplier, and to calculate the magnitude of the second received digital signal based on the output from the third multiplier and the fourth multiplier.

16. A touch sensitive apparatus comprising:

the circuitry according to claim 1;

an electrode array coupled to the circuitry; and control circuitry configured to receive the output from the circuitry and configured to sense at least the presence or an absence of a touch in the proximity of the electrode array.

17. A method for calculating the magnitude of a received signal from an electrode of capacitive touch sensitive apparatus, the method comprising:

generating a first digital signal using a first digital signal generator, the first digital signal representing a sinusoidal wave having a first frequency;

generating a second digital signal using a second digital signal generator, the second digital signal representing a sinusoidal wave having the first frequency, wherein the second digital signal is orthogonal to the first digital signal;

applying a driving signal to at least one electrode of an electrode array, wherein the driving signal is an analogue signal converted from the first digital signal;

receive a digital signal, wherein the received digital signal is indicative of a capacitive coupling experienced by the at least one electrode;

multiplying the first digital signal and the received digital signal together;

multiplying the second digital signal and the received digital signal together; and calculating the magnitude of the received digital signal based on the output from multiplying the first digital signal and the received digital signal together and multiplying the second digital signal and the received digital signal together.

\* \* \* \* \*